US012694267B2

(12) United States Patent
Shibasaki

(10) Patent No.: US 12,694,267 B2
(45) Date of Patent: Jul. 28, 2026

(54) OPTIMIZATION APPARATUS AND CONTROL METHOD THEREOF

(71) Applicant: FUJITSU LIMITED, Kawasaki (JP)

(72) Inventor: Takayuki Shibasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 734 days.

(21) Appl. No.: 18/087,996

(22) Filed: Dec. 23, 2022

(65) Prior Publication Data

US 2023/0131088 A1     Apr. 27, 2023

Related U.S. Application Data

(63) Continuation of application No. 16/524,784, filed on Jul. 29, 2019, now Pat. No. 11,568,204.

(30) Foreign Application Priority Data

Sep. 14, 2018     (JP) ................................. 2018-172429

(51) Int. Cl.
*G06N 3/044* (2023.01)
*G06F 17/18* (2006.01)
*G06N 3/063* (2023.01)

(52) U.S. Cl.
CPC ............. *G06N 3/044* (2023.01); *G06F 17/18* (2013.01); *G06N 3/063* (2013.01)

(58) Field of Classification Search
CPC ........ G06N 10/00; G06N 10/60; G06N 3/044; G06N 3/063; G06F 17/18
See application file for complete search history.

(56) References Cited

U.S. PATENT DOCUMENTS

| | | | |
|---|---|---|---|
| 5,710,830 | A | 1/1998 | Holeva |
| 7,061,007 | B1 | 6/2006 | Ugajin et al. |

(Continued)

FOREIGN PATENT DOCUMENTS

| | | |
|---|---|---|
| JP | 5-120252 | 5/1993 |
| JP | 8-153085 | 6/1996 |

(Continued)

OTHER PUBLICATIONS

Yang et al., "Parameter-Optimized Simulated Annealing for Application Mapping on Networks-on-Chip," in Y. Hamadi and M. Schoenauer (Eds.): LION 6, LNCS 7219, pp. 307-322, 2012 (Year: 2012).*

(Continued)

*Primary Examiner* — Miranda M Huang
*Assistant Examiner* — Yao David Huang
(74) *Attorney, Agent, or Firm* — STAAS & HALSEY LLP

(57) ABSTRACT

In an optimization apparatus, a computing unit searches for the ground state of an Ising model generated by converting an optimization problem to be solved, based on Ising model information representing the Ising model and a temperature parameter. A control unit determines the minimum value of the temperature parameter, based on a resolution in energy of the computing unit for the Ising model and a first reference value indicating an acceptance probability of state transition in the Ising model at the minimum value, determines a maximum amount of change in energy, based on the Ising model information, determines the maximum value of the temperature parameter, based on the determined maximum amount of change in energy and a second reference value that is greater than the first reference value and indicates the acceptance probability at the maximum value, (Continued)

and sends the minimum and maximum values to the computing unit.

9 Claims, 16 Drawing Sheets

(56) References Cited

U.S. PATENT DOCUMENTS

| | | | |
|---|---|---|---|
| 2016/0063391 | A1 | 3/2016 | Hayashi et al. |
| 2016/0118106 | A1 | 4/2016 | Yoshimura et al. |
| 2017/0364362 | A1 | 12/2017 | Lidar et al. |
| 2018/0218279 | A1 | 8/2018 | Lechner et al. |
| 2019/0130295 | A1 | 5/2019 | Okuyama et al. |
| 2019/0244098 | A1 | 8/2019 | Tsukamoto et al. |
| 2019/0362270 | A1 | 11/2019 | Haener et al. |
| 2020/0042570 | A1 | 2/2020 | Tamura |
| 2020/0050921 | A1 | 2/2020 | Tamura |
| 2020/0074279 | A1 | 3/2020 | Koyama et al. |
| 2020/0090026 | A1 | 3/2020 | Shibasaki |
| 2021/0049475 | A1 | 2/2021 | Koyama |
| 2021/0117188 | A1 | 4/2021 | Okuyama |
| 2021/0216608 | A1 | 7/2021 | Koyama |
| 2021/0319154 | A1 | 10/2021 | Dote et al. |
| 2022/0188678 | A1 | 6/2022 | Kushibe et al. |

FOREIGN PATENT DOCUMENTS

| | | |
|---|---|---|
| JP | 2008-140210 | 6/2008 |
| JP | 2016-51350 | 4/2016 |
| JP | 2016-103282 | 6/2016 |

OTHER PUBLICATIONS

Zhao, Xinchao, "Simulated annealing algorithm with adaptive neighborhood," Applied Soft Computing 11 (2011) 1827-1836 (Year: 2011).*

Roma, et al., "The ground state energy of the Edwards-Anderson spin glass model with a parallel tempering Monte Carlo algorithm," arXiv:0806.1054v2 [cond-mat.stat-mech] Mar. 23, 2009 (Year: 2009).*

Lee et al., "Determination of initial temperature in fast simulated annealing," Comput Optim Appl (2014) 58:503-522 (Year: 2014).*

Smith et al., "Dominance-Based Multiobjective Simulated Annealing," in IEEE Transactions on Evolutionary Computation, vol. 12, No. 3, pp. 323-342, Jun. 2008 (Year: 2008).*

Venturelli et al., "Job Shop Scheduling Solver based on Quantum Annealing," arXiv:1506.08479v2 [quant-ph] Oct. 17, 2016 (Year: 2016).*

Tsukamoto et al., "An Accelerator Architecture for Combinatorial Optimization Problems," Fujitsu Sci. Tech. J., vol. 53, No. 5, pp. 8-13 (Year: 2017).*

Yamaoka et al., "A 20k-Spin Ising Chip to Solve Combinatorial Optimization Problems With CMOS Annealing," IEEE Journal of Solid-State Circuits, vol. 51, No. 1, Jan. 2016 (Year: 2016).*

White, "Concepts of scale in simulated annealing," AIP Conf. Proc. 122, 261-270 (Year: 1984).*

Gyoten et al.; "Enhancing the Solution Quality of Hardware Ising-Model Solver via Parallel Tempering"; 2018 IEEE/ACM International Conference on Computer-Aided Design (ICCAD); Conference Paper | Publisher: IEEE Cited by: Papers (5) (Year: 2018).

Mathialakan et al.; "Low-cost Bitwise 2D Ising Model Representation Using Monte Carlo and Metropolis Algorithm"; 2016 Sixteenth International Conference on Advances in ICT for Emerging Regions (ICTer); Conference Paper | Publisher: IEEE (Year: 2016).

Office Action, dated May 31, 2022, in corresponding Japanese Patent Application No. 2018-172429 (6 pp.).

Koji Hukushima, et al., "Exchange Monte Carlo Method and Application to Spin Glass Simulations", Proceedings of Journal of the Physical Society of Japan, vol. 65, Issue 6, Jun. 15, 1996, pp. 1-10 with Figures (6 pp.) and Bibliographic Information (1 p.).

Office Action, dated Jun. 10, 2022, in U.S. Appl. No. 16/524,784 (18 pp.).

Notice of Allowance, dated Oct. 4, 2022, in U.S. Appl. No. 16/524,784 (16 pp.).

U.S. Appl. No. 16/524,754, filed Jul. 29, 2019, Takayuki Shibasaki, Fujitsu Limited.

* cited by examiner

COMPUTING UNIT <u>41</u>

OPTIMIZATION APPARATUS AND CONTROL METHOD THEREOF

CROSS-REFERENCE TO RELATED APPLICATION

This application is a continuation of U.S. patent application Ser. No. 16/524,784, filed Jul. 29, 2019, which is based upon and claims the benefit of priority of the prior Japanese Patent Application No. 2018-172429, filed on Sep. 14, 2018, the entire contents of each of which are incorporated herein by reference.

FIELD

The embodiments discussed herein relate to an optimization apparatus and a control method thereof.

BACKGROUND

Optimization apparatuses (sometimes called Ising machines or Boltzmann machines) have been used to solve multivariable optimization problems using Ising energy functions, whereas Von Neumann computers have difficulty in solving such optimization problems. An optimization apparatus solves a problem by converting it into an Ising model. Here, the Ising model expresses the behavior of magnetic spins.

For example, the optimization apparatus is able to model the problem using a neural network. In this case, a plurality of bits corresponding to a plurality of spins included in the Ising model each function as a neuron, which outputs 0 or 1 according to the values of the other bits and weight coefficients (may be called coupling coefficients) representing the strength of interactions between the own bit and each of the other bits. For example, the optimization apparatus finds, as a solution, the values of the bits that minimize the value of an energy function of the Ising model with a stochastic search method, such as simulated annealing or a replica exchange method (may be called an exchange Monte Carlo method). Hereinafter, the value of the energy function may be called an energy.

For example, in the simulated annealing and the replica exchange method, a probability A of accepting a state transition (flipping of a bit value) that causes a change in energy $\Delta E$ is defined as the following equation (1), so that the state will reach an optimal solution in the limit of infinite time.

$$A = f(-\Delta E/T) = \min[1, \exp(-\Delta E/T)] \qquad (1)$$

In the equation (1), T is a temperature parameter. In the simulated annealing, an initial temperature value is sufficiently high for a problem, and the temperature value is decreased after every certain number of iterations in a stochastic search. In the replica exchange method, a plurality of replicas are set at different temperatures, and a stochastic search is carried out in each replica at the fixed temperature. Then, after every certain number of iterations, the states (bit values) of replicas are exchanged according to the differences in energy and temperature between the replicas. In this connection, the temperatures of the replicas may be exchanged, instead of the states.

See, for example, the following documents:

Japanese Laid-open Patent Publication No. 05-120252
Japanese Laid-open Patent Publication No. 08-153085
Japanese Laid-open Patent Publication No. 2016-51350
Japanese Laid-open Patent Publication No. 2016-103282

K. Hukushima and K. Nemoto, "Exchange Monte Carlo Method and Application to Spin Glass Simulations", Journal of the Physical Society of Japan, 1996, Volume 65, pp. 1604-1611

Please note that optimization problems to be solved each have a different amount of possible change in energy. Therefore, conventional optimization apparatuses have difficulty in setting temperature to within an appropriate range. If an optimization apparatus fails to set temperature to within an appropriate range, the acceptance probabilities of state transitions are not set appropriately, which may cause a state transition too often or no state transition at all. This prevents convergence to an optimal solution and thus deteriorates the accuracy of solution.

SUMMARY

According to one aspect, there is provided an optimization apparatus including: a computing unit configured to search for a ground state of an Ising model, based on Ising model information and a temperature parameter, the Ising model being generated by converting an optimization problem to be solved, the Ising model information representing the Ising model; and a control unit configured to determine a minimum value of the temperature parameter, based on a resolution in energy of the computing unit for the Ising model and a first reference value indicating an acceptance probability of state transition in the Ising model at the minimum value of the temperature parameter, determine a maximum amount of change in energy, based on the Ising model information, determine a maximum value of the temperature parameter, based on a second reference value and the maximum amount of change in energy, the second reference value being greater than the first reference value and indicating the acceptance probability at the maximum value of the temperature parameter, and send the minimum value and the maximum value to the computing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, preferred embodiments will be described with reference to the accompanying drawings.

Optimization apparatuses to be described below are each to search for the values of bits (the ground state of an Ising model) that minimize an energy function from combinations of the values of all bits respectively corresponding to all spins in the Ising model. The Ising model is generated by converting an optimization problem to be solved.

For example, an Ising energy function E(x) is defined as the following equation (2).

$$E(x) = -\sum_{(i,j)} W_{ij} x_i x_j - \sum_i b_i x_i \qquad (2)$$

The first term on the right side is to calculate the sum of the products of the values (0 or 1) of two bits and a weight coefficient over all possible pairs of all bits of the Ising model, which are mutually exclusive and collectively exhaustive. Here, $x_i$ and $x_j$ are variables (may be called state variables) that represent the values of the i-th and j-th bits, respectively. $W_{ij}$ is a weight coefficient that indicates the strength of an interaction between the i-th bit and the j-th bit. In this connection, $W_{ii}=0$ is true. In addition, $W_{ij}=W_{ji}$ is often true (this means that a weight coefficient matrix is often a symmetric matrix). In addition, the weight coefficient $W_{ij}$ has a prescribed bit width (for example, 16 bits, 32 bits, 64 bits, 128 bits, or another).

The second term on the right side is to calculate the sum of the products of a bias coefficient and a variable representing a bit value over all bits. Here, $b_i$ is a bias coefficient of the i-th bit.

In addition, in the case where the variable $x_i$ changes to $1-x_i$, an increase in the variable $x_i$ is expressed as: $\Delta x_i=(1-x_i)-x_i=1-2x_i$. A change in energy (the amount of change in energy) $\Delta E_i$ due to flipping of a bit value is defined as the following equation (3).

$$\Delta E_i = E(x)|_{x_i \to 1-x_i} - E(x) = -\Delta x_i \left( \sum_j W_{ij} x_j + b_i \right) = -\Delta x_i h_i \qquad (3)$$

In the equation (3), $\Delta x_i$ has a value of $-1$ when the variable $x_i$ changes from 1 to 0, and has a value of 1 when the variable $x_i$ changes from 0 to 1. $h_i$ is referred to as a local field, and the change in energy $\Delta E_i$ is calculated by multiplying the local field $h_i$ by a sign (+1 or −1) according to $\Delta x_i$.

In addition, a change in the local field $h_i$ is expressed as $\Delta h_i=+W_{ij}$ when the variable $x_j$ changes from 0 to 1, and as $\Delta h_i=-W_{ij}$ when the variable $x_j$ changes from 1 to 0.

First Embodiment

Figure 1:
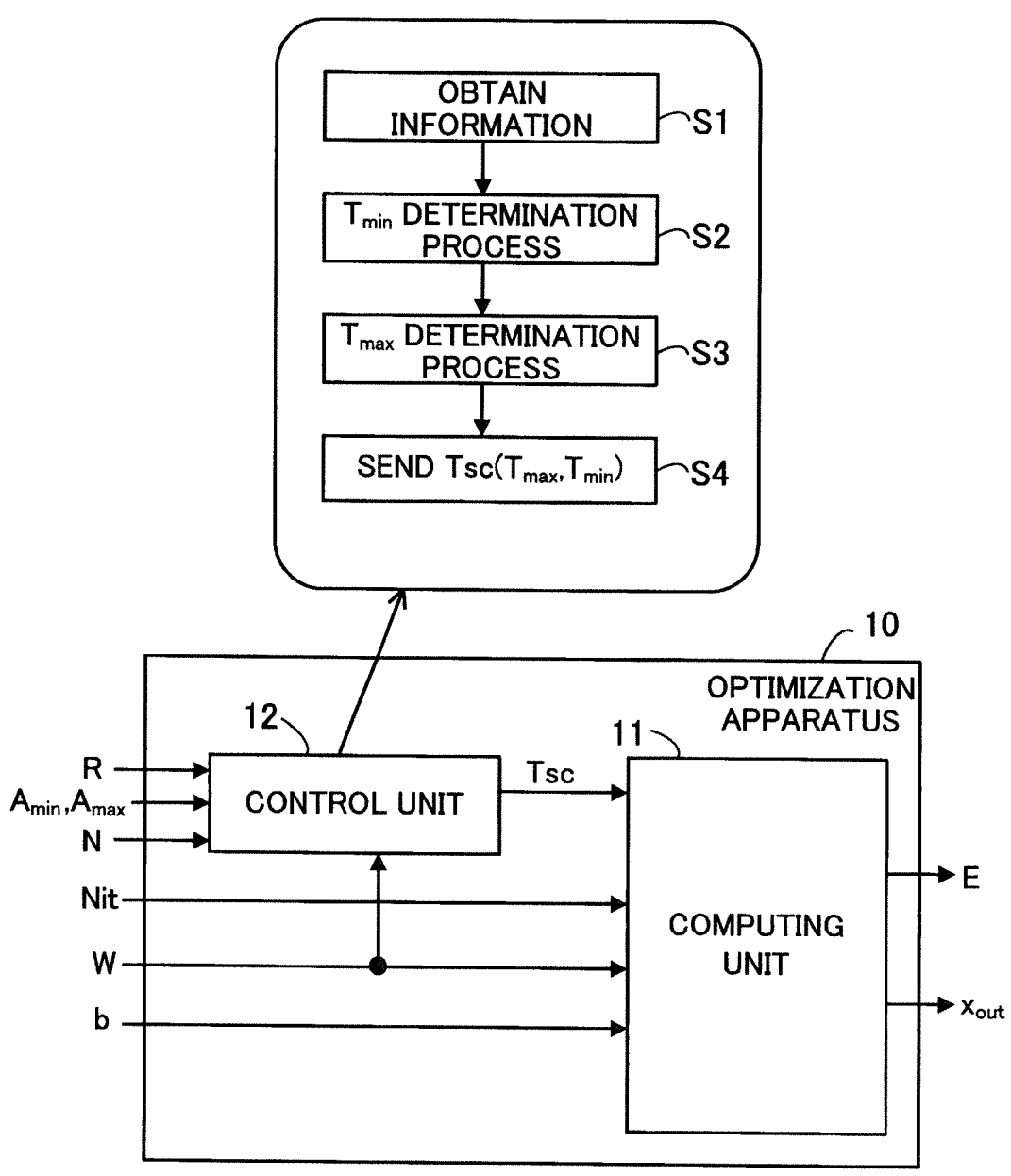
FIG. 1 illustrates an example of an optimization apparatus according to a first embodiment.

FIG. 1 illustrates an example of an optimization apparatus according to a first embodiment.

The optimization apparatus 10 of the first embodiment is a single- or multi-chip semiconductor integrated circuit (for example, field programmable gate array (FPGA) or the like). The optimization apparatus 10 includes a computing unit 11 and a control unit 12.

The computing unit 11 searches for the ground state of an Ising model on the basis of Ising model information representing the Ising model and a temperature parameter T. The Ising model information to be used by the computing unit 11 includes a weight coefficient set W and a bias coefficient set b. In addition, in the example of FIG. 1, the computing unit 11 is supplied with an iteration count Nit.

For example, to search for the ground state, a stochastic search, such as simulated annealing or a replica exchange method, is used. The computing unit 11 outputs, as a result (solution) of searching for the ground state, the values (state $x_{out}$t) of bits obtained by repeating a process of updating the value of a bit as many times as specified by the iteration count Nit while accepting a state transition with the probability defined as the above-described equation (1). In addition, the computing unit 11 outputs energy E obtained in that state.

The computing unit 11 obtains the Ising model information and iteration count Nit from a control apparatus (for example, personal computer (PC)) (not illustrated), for example.

Other than the Ising model information, the control unit 12 obtains a resolution R in energy of the computing unit 11 for the Ising model, and reference values $A_{min}$ and $A_{max}$ for an acceptance probability of state transition for the Ising model, from the control apparatus (not illustrated), for example. The resolution R indicates the minimum amount of change in energy, and depends on the hardware of the computing unit 11. An appropriate resolution R based on the hardware of the computing unit 11 is set by the control apparatus, for example.

The reference value $A_{min}$ indicates an acceptance probability at a minimum value $T_{min}$ of the temperature parameter T. The reference value $A_{min}$ is set to a sufficiently small value (for example, 0.001 or the like) such that the acceptance probability of state transition leading to an energy increase at a low temperature (i.e., when the temperature parameter T has a small value) is sufficiently low. The reference value $A_{max}$ is greater than the reference value $A_{min}$ and indicates the acceptance probability at a maximum value $T_{max}$ of the temperature parameter T. The reference value $A_{max}$ is set to an average value (for example, 0.25, 0.5, 0.75, or the like) such that the acceptance probability of state transition to any state (including a state transition leading to an energy increase) at a high temperature (i.e., when the temperature parameter T has a high value) is sufficiently high.

The minimum value $T_{min}$ is expressed as the following equation (4).

$$T_{min}=-R/\ln(A_{min}) \qquad (4)$$

The control unit 12 determines the minimum value $T_{min}$ with the equation (4) using the resolution R and the reference value $A_{min}$.

The maximum value $T_{max}$ is expressed as the following equation (5).

$$T_{max} = -\max(\Delta E) / \ln(A_{max}) \tag{5}$$

In the equation (5), $\max(\Delta E)$ denotes the maximum amount of change in energy $\Delta E$.

The control unit 12 determines $\max(\Delta E)$ on the basis of the Ising model information.

Assuming that the weight coefficient $W_{ij}$ is dominant over the bias coefficient $b_i$ in the above-described equation (3), $\max(\Delta E)$ is approximated by the following expression (6).

$$\max(\Delta E) \approx \frac{\left(\sum_{ij} |W_{ij}|\right)}{N} \tag{6}$$

In the expression (6), N denotes a total bit count in the Ising model. That is, $\max(\Delta E)$ is approximated to a value calculated by dividing the sum of absolute values of the weight coefficients $W_{ij}$ by the total bit count N.

The control unit 12 determines $\max(\Delta E)$ with the expression (6) using the weight coefficient set W and total bit count N included in the Ising model information. Then, the control unit 12 determines the maximum value $T_{max}$ with the equation (5) using the determined max $(\Delta E)$ and the reference value $A_{max}$.

For example, assuming that the weight coefficients $W_{ij}$ all take the maximum values of 16 bit signed integer, the total bit count N in the Ising model is 1024, and the bias coefficients $b_i$ are ignored, $\max(\Delta E)$ is calculated to be $1024 \times 2^{15} = 33554432$. Assuming that $A_{max} = 0.75$, $T_{max}$ is calculated to be $T_{max} = -33554432/\ln(0.75) = 116637202$ from the equation (5). In this connection, in actual, it does not happen that the weight coefficients $W_{ij}$ all take the maximum values, and so the maximum value $T_{max}$ is lower than the above value.

In addition, in an optimization problem taking into account only the existence or absence of interactions between bits, the weight coefficients $W_{ij}$ each takes any of the values 1, 0, and −1. In this case, $\max(\Delta E)$ is calculated to be $1024 \times 1 = 1024$. In the case of $A_{max} = 0.75$, the maximum value $T_{max}$ is calculated to be approximately 3560.

As described above, the maximum value $T_{max}$, greatly varies depending on an optimization problem to be solved.

In this connection, another method of calculating max $(\Delta E)$ (for example, using the bias coefficients $b_i$) will be described later.

The control unit 12 generates temperature schedule information Tsc including the determined minimum value $T_{min}$ and maximum value $T_{max}$ and sends it to the computing unit 11, for example.

In the case where the computing unit 11 employs the simulated annealing to search for the ground state, the control unit 12 additionally includes information indicating how to decrease the value of the temperature parameter T in the temperature schedule information Tsc, which is then supplied to the computing unit 11. In this connection, the control unit 12 may directly lower the temperature parameter T from the maximum value $T_{max}$ to the minimum value $T_{min}$ according to a prescribed temperature schedule.

In the case where the computing unit 11 employs the replica exchange method to search for the ground state, the control unit 12 determines temperature schedule information Tsc including a value of the temperature parameter T in a range from the maximum value $T_{max}$ to the minimum value $T_{min}$ for each replica included in the computing unit 11, and sends it to the computing unit 11.

For example, the control unit 12 may be implemented by using an application-specific integrated circuit (ASIC), an FPGA, or another application-specific electronic circuit. Alternatively, the control unit 12 may be a central processing unit (CPU), a digital signal processor (DSP) or another processor. In this case, the processor performs the above-described processes by executing programs stored in a memory device (not illustrated).

The following describes an example of how the optimization apparatus 10 of the first embodiment operates.

FIG. 1 illustrates an example of an operation flow of the control unit 12 of the optimization apparatus 10. The control unit 12 obtains Ising model information (a total bit count N and a weight coefficient set W), an iteration count Nit, a resolution R, reference values $A_{min}$, and $A_{max}$, and other information from a control apparatus (not illustrated), for example (step S1). Then, the control unit 12 performs the above-described $T_{min}$ determination process (step S2) and $T_{max}$ determination process (step S3), and sends temperature schedule information Tsc including the minimum value $T_{min}$ and maximum value $T_{max}$ to the computing unit 11 (step S4). In this connection, steps S2 and S3 may be executed in reverse order.

The computing unit 11 then searches for the ground state of the Ising model on the basis of the temperature parameter T specified by the temperature schedule information Tsc and the Ising model information. For example, the computing unit 11 outputs, as a result (solution) of searching for the ground state, the values (state $x_{out}$) of bits obtained by repeating a process of updating the value of a bit as many times as specified by the iteration count Nit while accepting a state transition with the probability defined as the above-described equation (1). Also, the computing unit 11 outputs energy E obtained in that state.

Figure 2:
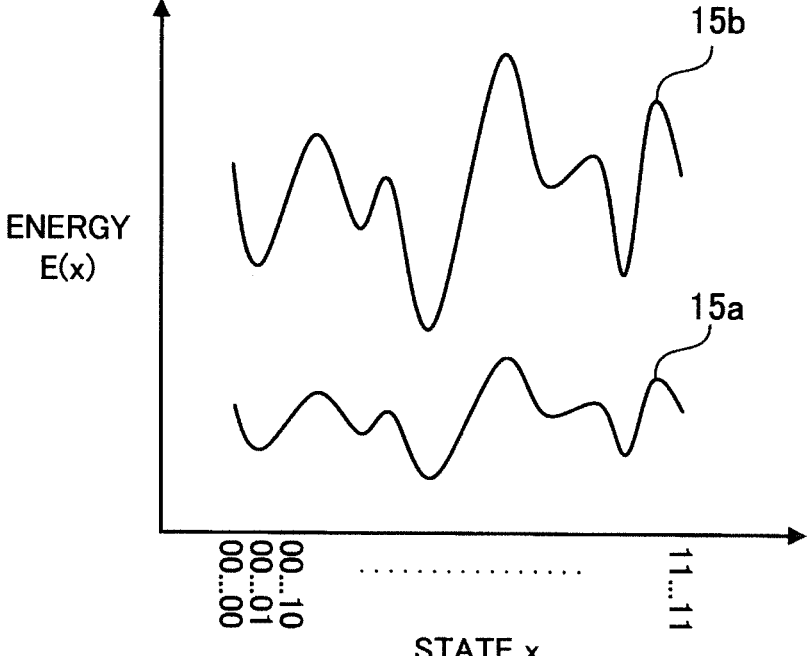
FIG. 2 illustrates an example of different changes in energy in different optimization problems to be solved.

FIG. 2 illustrates an example of different changes in energy in different optimization problems to be solved. In FIG. 2, the horizontal axis represents states x, and the vertical axis represents energy E(x).

For example, the energy E(x) in an optimization problem is represented by a waveform 15a, and the energy E(x) in another optimization problem is represented by a waveform 15b. It is obvious from the waveforms 15a and 15b that the waveform 15b has a greater amount of possible change in energy E(x) than the waveform 15a.

Therefore, in the case of using the same temperature parameter T for solving these optimization problems, a state transition may occur too often in solving the optimization problem in which the energy E(x) is represented by the waveform 15a. On the other hand, no state transition may occur at all in solving the optimization problem in which the energy E(x) is represented by the waveform 15b. These cases would hardly achieve convergence to an optimal solution, thereby deteriorating the accuracy of solution.

The optimization apparatus 10 of the first embodiment determines an amount of possible change in energy on the basis of the Ising model information, and determines a range of the temperature parameter T for searching for the ground state, on the basis of the amount of change. This approach enables the computing unit 11 to perform computation within an appropriate range of the temperature parameter T for an optimization problem to be solved. Therefore, it becomes possible to set an appropriate acceptance probability of state transition and thus to suppress a deterioration in the accuracy of solution for the optimization problem.

Second Embodiment

Figure 3:
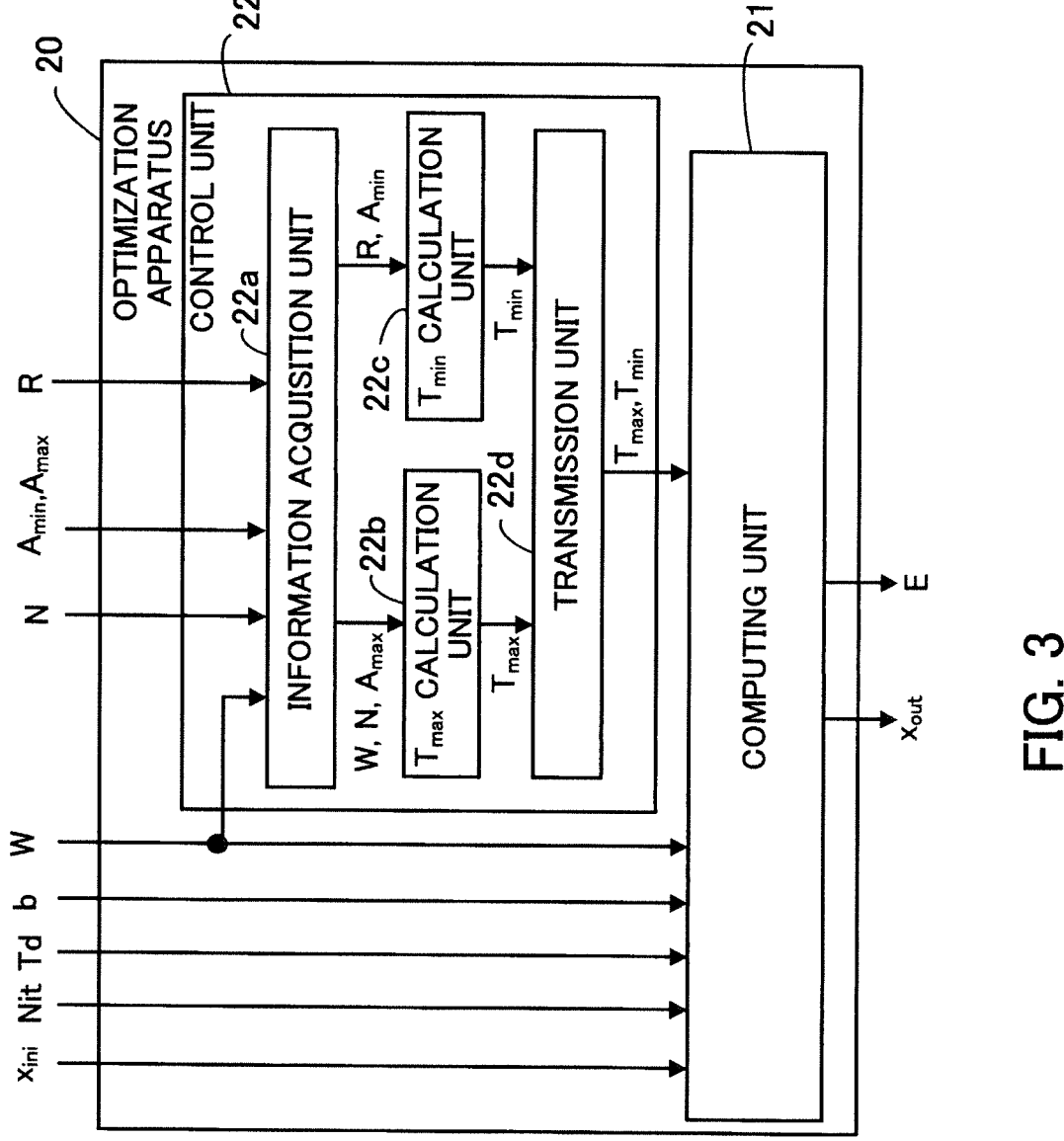
FIG. 3 illustrates an example of an optimization apparatus according to a second embodiment.

FIG. 3 illustrates an example of an optimization apparatus according to a second embodiment.

The optimization apparatus 20 of the second embodiment includes a computing unit 21 and a control unit 22.

The computing unit 21 searches for the ground state of an Ising model on the basis of Ising model information and a temperature parameter T with the simulated annealing. The Ising model information to be used by the computing unit 21 includes a weight coefficient set W, a bias coefficient set b, and the initial value $x_{ini}$ of each bit. In addition, in the example of FIG. 3, the computing unit 21 is supplied with an iteration count Nit and temperature drop control information Td indicating how to decrease the value of the temperature parameter T. The Ising model information, iteration count Nit, temperature drop control information Td are supplied by a control apparatus, such as a PC, for example.

The computing unit 21 outputs, as a result (solution) of searching for the ground state, the values (state $x_{out}$) of bits obtained by repeating a process of updating the value of a bit as many times as specified by the iteration count Nit while accepting a state transition with the probability defined as the above-described equation (1). In addition, the computing unit 21 outputs energy E obtained in that state. The example of circuitry for the computing unit 21 will be described later.

The control unit 22 includes an information acquisition unit 22a, a $T_{max}$ calculation unit 22b, a $T_{min}$ calculation unit 22c, and a transmission unit 22d.

The information acquisition unit 22a receives the weight coefficient set W, a total bit count N, the above-described reference values $A_{min}$ and $A_{max}$, and a resolution R supplied by a control apparatus, such as a PC, for example.

The $T_{max}$ calculation unit 22b calculates max($\Delta E$) with the above-described expression (6) using the weight coefficient set W and the total bit count N, and then determines the maximum value $T_{max}$ of the temperature parameter T with the equation (5) using the calculated max ($\Delta E$) and the reference value $A_{max}$.

The $T_{min}$ calculation unit 22c determines the minimum value $T_{min}$ with the above-described equation (4) using the resolution R and the reference value $A_{min}$.

The transmission unit 22d sends the minimum value $T_{min}$ and the maximum value $T_{max}$ to the computing unit 21.

Example of Computing Unit 21

Figure 4:
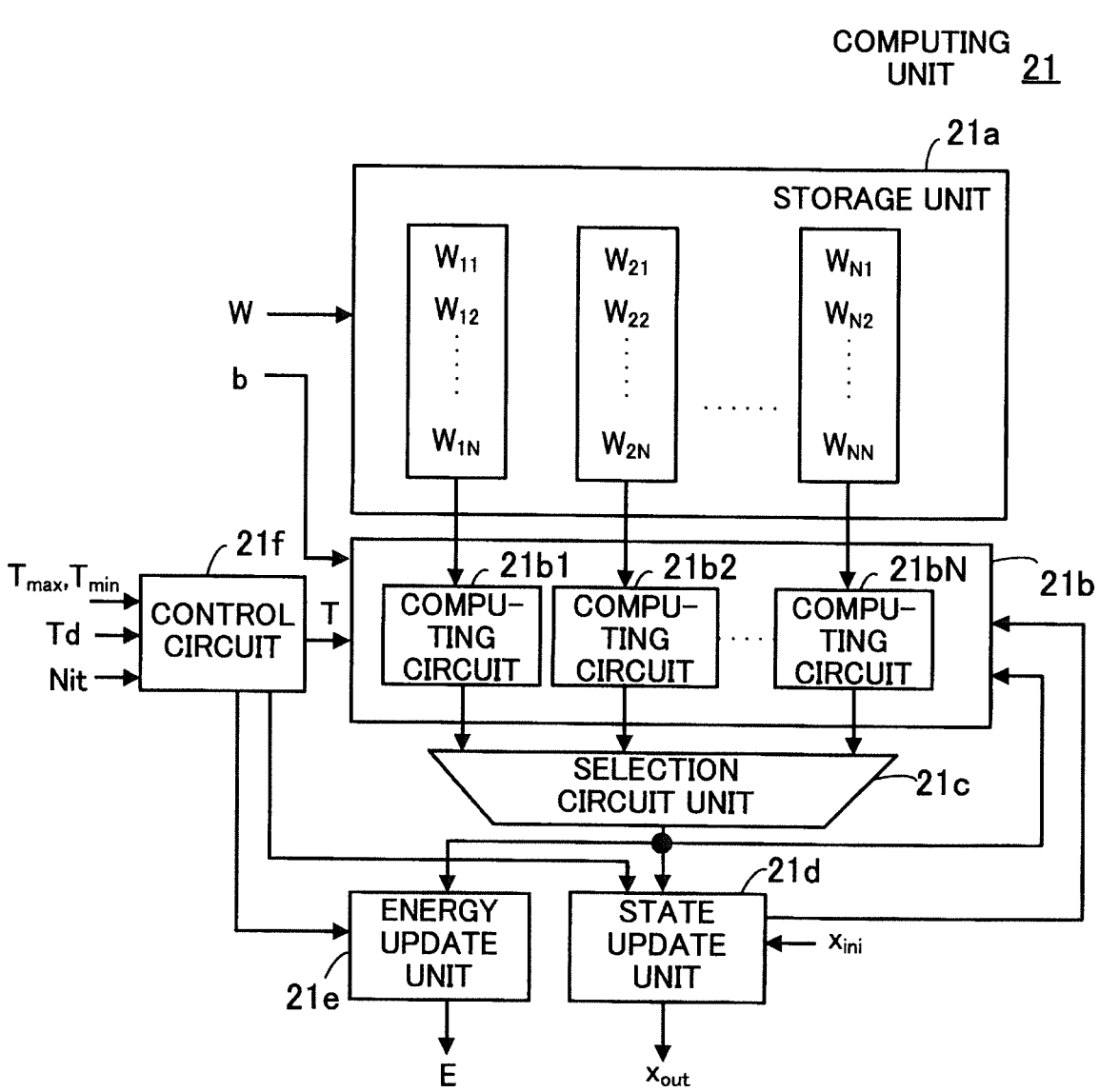
FIG. 4 illustrates an example of a computing unit that searches for the ground state with simulated annealing.

FIG. 4 illustrates an example of the computing unit that searches for the ground state with the simulated annealing.

The computing unit 21 includes a storage unit 21a, a computing circuit unit 21b, a selection circuit unit 21c, a state update unit 21d, an energy update unit 21e, and a control circuit 21f.

The storage unit 21a stores therein the weight coefficient set W (weight coefficients $W_{11}$ to $W_{NN}$). For example, the storage unit 21a may be a register, a static random access memory (SRAM), or the like.

The computing circuit unit 21b obtains the bias coefficient set b and the weight coefficient set W stored in the storage unit 21a, receives the value of an updated bit among all bits from the state update unit 21d, and receives an index identifying the updated bit from the selection circuit unit 21c. Then, on the basis of these, the computing circuit unit 21b calculates, for each of the N bits, a change in energy of the Ising model due to a change of the bit. In addition, the computing circuit unit 21b determines for each of the N bits whether to accept its update, on the basis of value inequality between thermal excitation energy and the change in energy calculated for the bit. Then, the computing circuit unit 21b outputs, with respect to each of the N bits, flag information indicating a result of determining whether to accept its update, and the change in energy.

The thermal excitation energy is determined on the basis of a random number generated by a random number generation circuit, to be described later, and the temperature parameter T supplied by the control circuit 21f, for example.

In the example of FIG. 4, the computing circuit unit 21b includes N computing circuits 21b1, 21b2, . . . , and 21bN.

The computing circuit 21b1 calculates the change in energy of the Ising model to be caused by changing a bit with index=1, and determines whether to accept an update of the bit on the basis of value inequality between the thermal excitation energy and the calculated change in energy. Then, the computing circuit 21b1 outputs flag information and the change in energy. The computing circuits 21b2 to 21bN process the other bits with index=2 to N in the same way as the computing circuit 21b1.

An example of circuitry for the computing circuits 21b1 to 21bN will be described later.

The selection circuit unit 21c selects one of accepted bits whose updates are accepted, using a random number on the basis of the flag information, and outputs the flag information about the selected accepted bit, the change in energy, and an index identifying the accepted bit. The selection circuit unit 21c may generate the index by itself. Alternatively, in the case where the computing circuits 21b1 to 21bN each hold such an index, the selection circuit unit 21c may obtain the indices from the computing circuits 21b1 to 21bN and outputs the index of the selected accepted bit.

The state update unit 21d holds the value of each bit, and updates the stored contents on the basis of the flag information and index output from the selection circuit unit 21c. The state update unit 21d holds the initial value $x_{ini}$ of each bit, and outputs, as a result of searching for the ground state, the values (state $x_{out}$ of bits obtained by repeating a process of updating the value of a bit as many times as specified by the iteration count Nit, under the control of the control circuit 21f.

The energy update unit 21e updates the energy of the Ising model on the basis of the flag information and change in energy output from the selection circuit unit 21c. The energy update unit 21e outputs the energy E obtained by repeating the process of updating the value of a bit as many times as specified by the iteration count Nit, under the control of the control circuit 21f.

The control circuit 21f controls the temperature parameter T to be supplied to the computing circuit unit 21b, on the basis of the maximum value $T_{max}$ and minimum value $T_{min}$ of the temperature parameter T and the temperature drop control information Td. In addition, the control circuit 21f determines whether the process of updating the value of a bit has been repeated as many times as specified by the iteration count Nit. If the process of updating the value of a bit has been repeated as many times as specified by the iteration count Nit, the control circuit 21f causes the state update unit 21d to output the values of the bits held therein, and causes the energy update unit 21e to output the energy E obtained with the values.

Example of Computing Circuit

Figure 5:
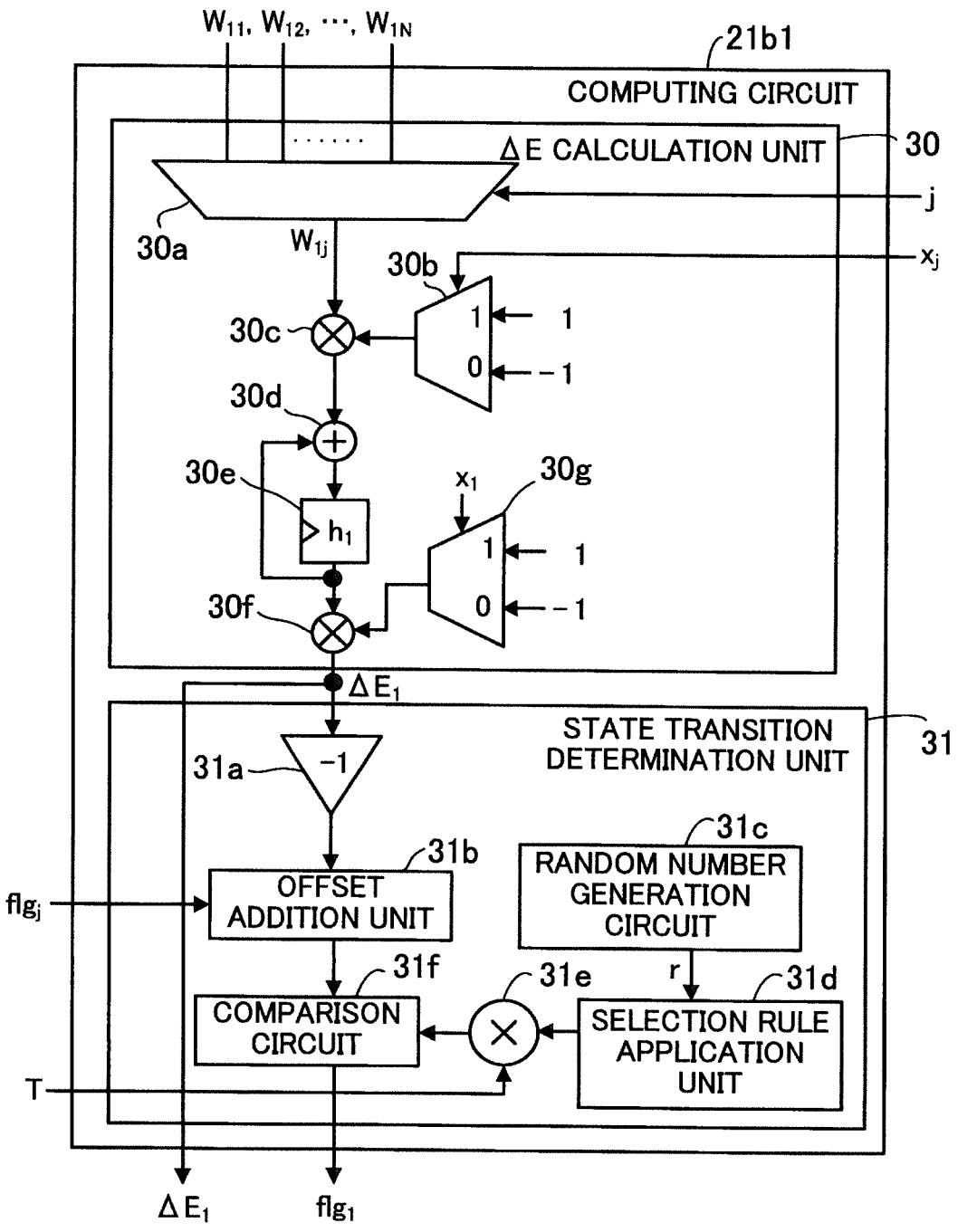
FIG. 5 illustrates an example of a computing circuit.

FIG. 5 illustrates an example of a computing circuit. FIG. 5 exemplifies the computing circuit $21b1$ illustrated in FIG. 4. The other computing circuits in FIG. 4 are implemented with the same circuitry.

The computing circuit $21b1$ includes a $\Delta E$ calculation unit 30 and a state transition determination unit 31.

The $\Delta E$ calculation unit 30 includes selection circuits $30a$ and $30b$, a multiplier $30c$, an adder $30d$, a register $30e$, a multiplier $30f$, and a selection circuit $30g$.

The selection circuit $30a$ selects and outputs one of the weight coefficients $W_{ij}$ (j=1 to N) stored in the storage unit $21a$, on the basis of index=j supplied by the selection circuit unit $21c$ of FIG. 4.

For example, when receiving index=N, the selection circuit $30a$ selects a weight coefficient $W_{1N}$.

The selection circuit $30b$ computes the amount of change in the bit $\Delta x_j$ with index=j. $\Delta x_j$ takes a value of $-1$ when the variable $x_j$, which is the value of a bit with index=j, changes from 1 to 0, and takes a value of 1 when the variable $x_j$ changes from 0 to 1. The selection circuit $30b$ selects and outputs a value of $-1$ when the variable $x_j$ (the updated value of the bit with index=j) supplied by the state update unit $21d$ is 0, and selects and outputs a value of 1 when the variable $x_j$ is 1.

The multiplier $30c$ outputs the product of the weight coefficient $W_{ij}$ output from the selection circuit $30a$ and the output value of the selection circuit $30b$.

The adder $30d$ calculates the sum of the output value of the multiplier $30c$ and a value stored in the register $30e$ and outputs the sum.

The register $30e$ takes in the output value (local field $h_1$) of the adder $30d$ in synchronization with a clock signal (not illustrated). The register $30e$ is a flip-flop, for example. In this connection, the initial value of the local field $h_1$ stored in the register $30e$ is a bias coefficient $b_1$.

The multiplier $30f$ outputs the product of the local field $h_1$ output from the register $30e$ and an output value of the selection circuit $30g$. This product indicates the change in energy $\Delta E_1$.

The selection circuit $30g$ computes $-\Delta x_1$. The selection circuit $30g$ outputs a value of $-1$ when the current variable $x_1$ stored in the state update unit $21d$ is 0, and a value of 1 when the current variable $x_1$ is 1.

The state transition determination unit 31 includes a sign inversion unit $31a$, an offset addition unit $31b$, a random number generation circuit $31c$, a selection rule application unit $31d$, a multiplier $31e$, and a comparison circuit $31f$.

The sign inversion unit $31a$ inverts a sign by multiplying the change in energy $\Delta E_1$ by $-1$.

The offset addition unit $31b$ adds an offset value to the output value $(-\Delta E_1)$ of the sign inversion unit $31a$. The offset addition unit $31b$ increases the offset value if flag information $flg_j$ that is supplied by the above-described selection circuit unit $21c$ indicates that the state transition is not accepted (that is, when the state transition does not occur). On the other hand, the offset addition unit $31b$ sets the offset value to zero if the flag information $flg_j$ indicates that the state transition is accepted (that is, when the state transition occurs). As the offset value increases, the state transition is more likely to be accepted. In the case where the current state is in a local solution, an escape from the local solution is promoted.

The random number generation circuit $31c$ generates a uniform random number r ranging from 0 to 1, inclusive.

The selection rule application unit $31d$ outputs a value under a selection rule (for example, the Metropolis method) for performing the simulated annealing.

In the case of the simulated annealing, to define a probability A of accepting a state transition causing a change in energy $\Delta E$ as the equation (1), for example, ensures that a state reaches an optimal solution in the limit of infinite time, as described earlier.

Consider the case of using the probability A defined as the equation (1). Assuming that a steady state is reached after a sufficient number of iterations, the occupation probability of each state follows a Boltzmann distribution at thermal equilibrium in thermodynamics. Because the occupation probabilities of low-energy states increase as the temperature is gradually reduced from a high value, a sufficient reduction in temperature is expected to lead to a low-energy state. This phenomenon is viewed as analogous to state transitions observed during annealing of materials, and this technique is therefore called simulated annealing. Probabilistic occurrence of a state transition leading to an energy increase corresponds to thermal excitation in physics.

A circuit for outputting flag information (=1), which indicates that a state transition causing a change in energy $\Delta E$ is accepted with the probability A, may be implemented using a comparator that outputs a value based on a comparison between $f(-\Delta E/T)$ of the equation (1) and the uniform random number r.

In this connection, the same function may be implemented by the following modification. In the case where the same monotonically increasing function is applied to two numbers, their value inequality does not change. This means that application of the same monotonically increasing function to two inputs of a comparator causes no change in the output of the comparator. For example, the inverse function $f^{-1}(-\Delta E/T)$ of $f(-\Delta E/T)$ may be used as a monotonically increasing function to be applied to $f(-\Delta E/T)$, and $f^{-1}(r)$, which uses r in place of $-\Delta E/T$ in $f^{-1}(-\Delta E/T)$, may be used as a monotonically increasing function to be applied to the uniform random number r. In this case, it is understood that a circuit that outputs a value of 1 when $-\Delta E/T > f^{-1}(r)$ has the same function as the above comparator. Further, since the temperature parameter T takes a positive value, the circuit may be configured to output a value of 1 when $-\Delta E > T \cdot f^{-1}(r)$.

The selection rule application unit $31d$ uses a conversion table for converting the uniform random number r input thereto into the above $f^{-1}(r)$ value, in order to output the $f^{-1}(r)$ value. In the case of employing the Metropolis method, $f^{-1}(r)$ is $\ln(r)$. The conversion table is stored in a memory device, such as random access memory (RAM) or flash memory.

The multiplier $31e$ outputs the product $(T \cdot f^{-1}(r))$ of the temperature parameter T, supplied by the control circuit $21f$, and $f^{-1}(r)$. $T \cdot f^{-1}(r)$ corresponds to thermal excitation energy.

The comparison circuit $31f$ compares $T \cdot f^{-1}(r)$ with the addition result obtained by the offset addition unit $31b$, and outputs $flg_1=1$ as flag information if the addition result is greater than $T \cdot f^{-1}(r)$ and $flg_1=0$ if the addition result is smaller than $T \cdot f^{-1}(r)$.

The following describes an example of how the optimization apparatus 20 of the second embodiment operates.

The information acquisition unit $22a$ of the control unit 22 obtains the Ising model information (total bit count N and weight coefficient set W), the resolution R, and the reference values $A_{min}$ and $A_{max}$ from a control apparatus (not illustrated), for example. Then, the $T_{max}$ calculation unit $22b$ and the $T_{min}$ calculation unit $22c$ determine the maximum value $T_{max}$ and minimum value $T_{min}$ of the temperature parameter T on the basis of the information obtained by the information acquisition unit 22*a*, and the transmission unit 22*d* sends the maximum value $T_{max}$ and minimum value $T_{min}$ to the computing unit 21.

The computing unit 21 then repeats the process of updating the value of a bit as many times as specified by the iteration count Nit while accepting a state transition with the probability defined as the above-described equation (1). The control circuit 21*f* of the computing unit 21 decreases the value of the temperature parameter T in accordance with the temperature drop control information Td each time the process of updating a bit is performed a prescribed number of times (<Nit). The initial value of the temperature parameter T is the maximum value $T_{max}$ and the end value thereof is the minimum value $T_{min}$.

Figure 6:
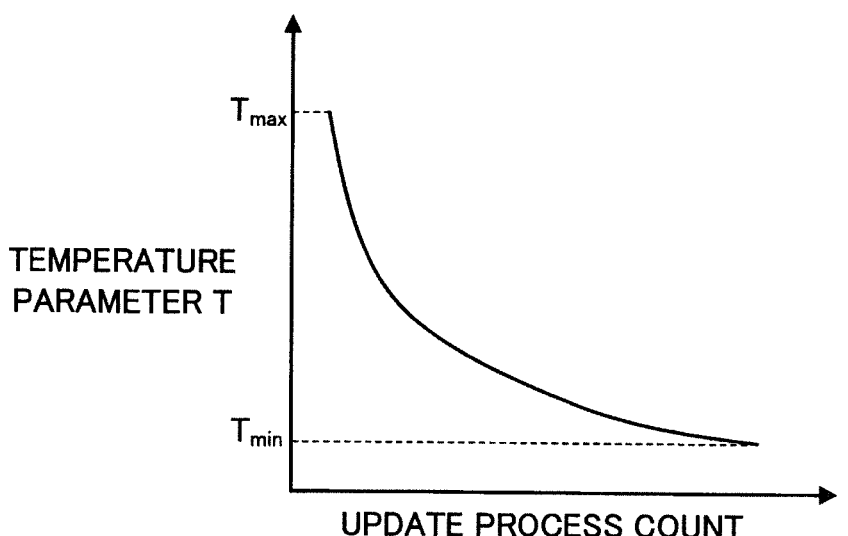
FIG. 6 illustrates an example of controlling a temperature parameter T.

FIG. 6 illustrates an example of controlling the temperature parameter T. In FIG. 6, the horizontal axis represents values of an update process count, and the vertical axis represents values of the temperature parameter T.

The temperature parameter T decreases from the maximum value $T_{max}$ as the number of iterations (update process count) of the process of updating the value of a bit increases. The greater the update process count, the less the amount of decrease in the temperature parameter T. When the temperature parameter T reaches the minimum value $T_{min}$, the control circuit 21*f* completes its control of the temperature parameter T. In this connection, in FIG. 6, the temperature T appears to decrease continuously with an increase in the update process count. However, the update process is performed a prescribed number of times at each value of the temperature parameter T, as described earlier.

The computing unit 21 outputs, as a result of searching for the ground state, the values (state $x_{out}$) of bits obtained by repeating the process of updating the value of a bit as many times as specified by the iteration count Nit. In addition, the computing unit 21 outputs energy E obtained in that state.

The above-described optimization apparatus 20 of the second embodiment determines an amount of possible change in energy on the basis of the Ising model information, and determines a range of the temperature parameter T for searching for the ground state, on the basis of the amount of change. This approach enables the computing unit 21 to perform computation with the simulated annealing within an appropriate range of the temperature parameter T for an optimization problem to be solved. Therefore, it becomes possible to set an appropriate acceptance probability of state transition and thus to suppress a deterioration in the accuracy of solution for the optimization problem.

Third Embodiment

Figure 7:
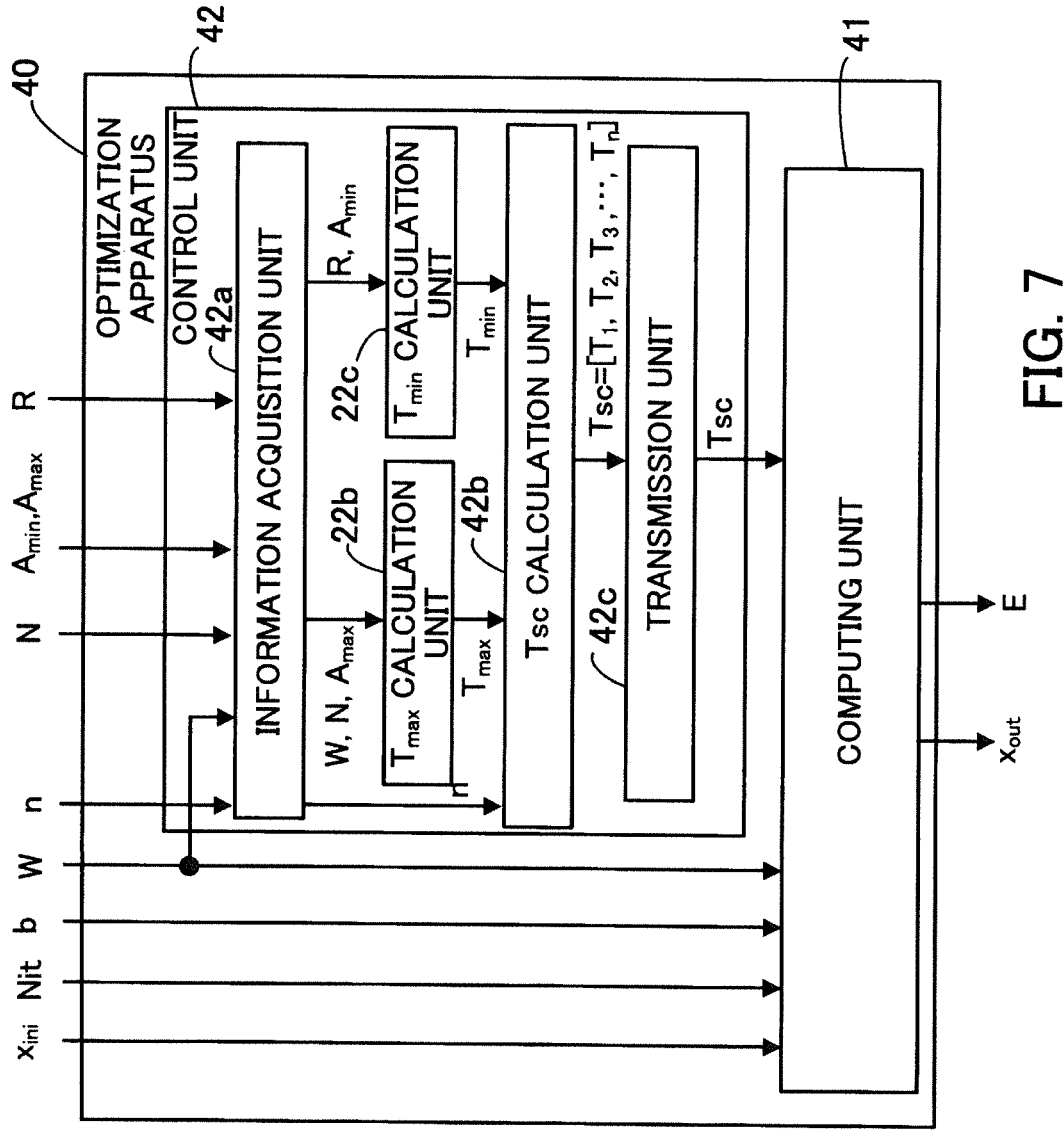
FIG. 7 illustrates an example of an optimization apparatus according to a third embodiment.

FIG. 7 illustrates an example of an optimization apparatus according to a third embodiment. In FIG. 7, the same reference numerals as used in FIG. 3 indicate the same component elements.

The optimization apparatus 40 of the third embodiment includes a computing unit 41 and a control unit 42.

The computing unit 41 searches for the ground state of an Ising model on the basis of Ising model information and a temperature parameter T with the replica exchange method. The computing unit 41 has a plurality of replicas that perform the above-described update process with respect to the same N bits. Each replica has a different temperature parameter T. According to the differences in energy and temperature (value of the temperature parameter T) between the replicas, the states or the values of the temperature parameter T are exchanged between replicas each time the update process is performed a prescribed number of times.

The Ising model information to be used by the computing unit 41 includes a weight coefficient set W, a bias coefficient set b, and the initial value $x_{ini}$ of each bit. In addition, in the example of FIG. 7, the computing unit 41 is supplied with an iteration count Nit. The Ising model information and iteration count Nit are supplied by a control apparatus, such as a PC, for example.

The computing unit 41 outputs, as a result of searching for the ground state, the values (state $x_{out}$) of bits that produce the minimum energy E in a replica providing the minimum energy E after each replica repeats the above-described update process as many times as specified by the iteration count Nit. In addition, the computing unit 41 outputs that minimum energy E. An example of circuitry for the computing unit 41 will be described later.

The control unit 42 includes an information acquisition unit 42*a* that obtains the number of replicas n (hereinafter, replica count n) in the computing unit 41, in addition to the same information as obtained by the information acquisition unit 22*a* of the control unit 22 of the optimization apparatus 20 of the second embodiment. The replica count n is also supplied by the control apparatus, such as a PC, for example.

In addition, the control unit 42 includes a Tsc calculation unit 42*b*, which is a different feature from the control unit 22 of the optimization apparatus 20 of the second embodiment.

The Tsc calculation unit 42*b* receives the replica count n obtained by the information acquisition unit 42*a*, and the maximum value $T_{max}$ and minimum value $T_{min}$ of the temperature parameter T determined by a $T_{max}$ calculation unit 22*b* and a $T_{min}$ in calculation unit 22*c*. Then, the Tsc calculation unit 42*b* calculates temperature schedule information Tsc including n temperature parameters $T_1$, $T_2$, $T_3$, . . . , $T_n$ in a range from the maximum value $T_{max}$ to the minimum value $T_{min}$ on the basis of the replica count n, maximum value $T_{max}$, and minimum value $T_{min}$.

For example, the temperature parameters $T_1$ to $T_n$ are calculated as $T_1 = T_{min}$, $T_2 = 2 \times (T_{max} - T_{min})/(T_n - 1)$, $T_3 = 3 \times (T_{max} - T_{min})/(T_{max} - 1)$, . . . , and $T_n = T_{max}$.

In this connection, the temperature parameters $T_1$ to $T_n$ may be generated so as to form an arithmetic progression or geometric progression.

A transmission unit 42*c* sends the temperature schedule information Tsc to the computing unit 41.

Example of Computing Unit 41

Figure 8:
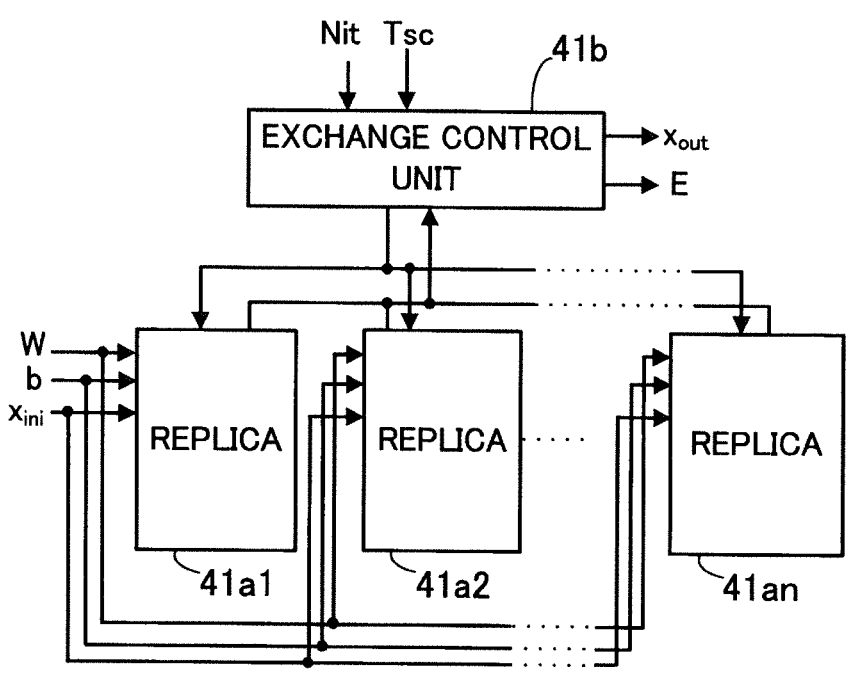
FIG. 8 illustrates an example of a computing unit that searches for the ground state with a replica exchange method.

FIG. 8 illustrates an example of the computing unit that searches for the ground state with the replica exchange method.

The computing unit 41 includes n replicas 41*a*1, 41*a*2, . . . , 41*an* and an exchange control unit 41*b*.

Each of the n replicas 41*a*1 to 41*an* includes a storage unit 21*a*, a computing circuit unit 21*b*, a selection circuit unit 21*c*, a state update unit 21*d*, and an energy update unit 21*e* as illustrated in FIG. 4. The replicas 41*a*1 to 41*an* each hold therein the same weight coefficient set W, and also have the same bias coefficient set b and the same initial values $x_{ini}$ set therein. In addition, the replicas 41*a*1 to 41*an* have different temperature parameters T (each has any one of the temperature parameters $T_1$ to $T_n$) set by the exchange control unit 41*b*. The replicas 41*a*1 to 41*an* each perform a process of updating the value of a bit using the corresponding temperature parameter T.

In this connection, each of the replicas 41a1 to 41an holds the minimum energy value as of the present time point and a state in which the minimum energy value is obtained.

The exchange control unit 41b sets different temperature parameters T in the n replicas 41a1 to 41an on the basis of the temperature schedule information Tsc. In addition, the exchange control unit 41b monitors the energies in the replicas 41a1 to 41an each time the update process is performed a prescribed number of times in the replicas 41a1 to 41an. Then, the exchange control unit 41b exchanges the temperature parameters T between two of the replicas 41a1 to 41an with an exchange probability defined as the following equation (7) using the energies and temperature parameters of the two replicas. In this connection, the exchange control unit 41b may exchange the states between the two replicas, instead of the temperature parameters T.

$$p_{ij} = f((1/T_i - 1/T_j)(E_i - E_j)) \tag{7}$$

In the equation (7), $T_i$ is a temperature parameter set in the i-th replica among the replicas 41a1 to 41an. $T_j$ is a temperature parameter set in the j-th replica among the replicas 41a1 to 41an. $E_i$ denotes an energy in the i-th replica among the replicas 41a1 to 41an. $E_j$ denotes an energy in the j-th replica among the replicas 41a1 to 41an. The function f in the equation (7) is the same as that in the equation (1), and includes $(1/T_i - 1/T_j)(E_i - E_j)$ in place of $-\Delta E/T$ in $\min[1, \exp(-\Delta E/T)]$ of the equation (1).

Even through the above exchange, a probability distribution of states at a value of each of these temperature parameters T converges to the Boltzmann distribution at the value of the temperature parameter T. In this connection, two replicas whose temperature parameters T have values close to each other are selected for the exchange so as not to produce too small exchange probability.

When the number of iterations of the process of updating the value of a bit in the replicas 41a1 to 41an reaches the iteration count Nit, the exchange control unit 41b obtains the minimum energy value in each of the replicas 41a1 to 41an and the state in which the minimum energy value is obtained. Then, the exchange control unit 41b outputs the minimum energy E among the minimum energy values in the replicas 41a1 to 41an, and the state $x_{out}$ in which that minimum energy E is obtained.

The following explains the example of how the optimization apparatus 40 of the third embodiment operates.

Figure 9:
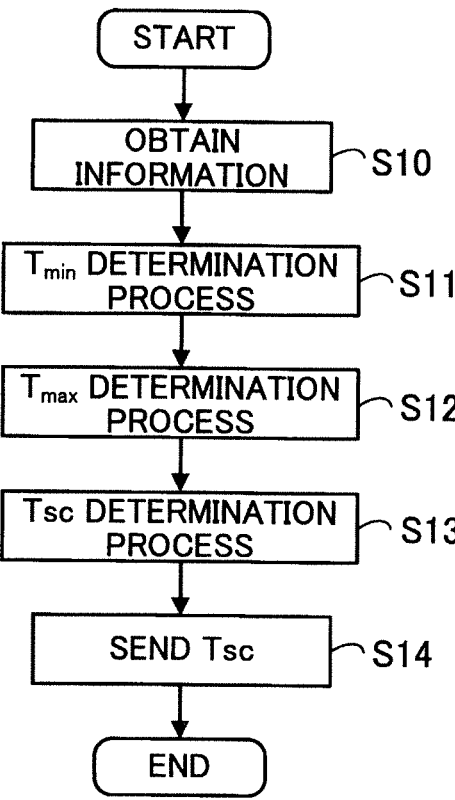
FIG. 9 is a flowchart illustrating an operation flow of a control unit of the optimization apparatus according to the third embodiment.

FIG. 9 is a flowchart illustrating an operation flow of the control unit of the optimization apparatus according to the third embodiment.

The information acquisition unit 42a of the control unit 42 in the optimization apparatus 40 obtains the Ising model information (total bit count N and weight coefficient set W), the replica count n, the resolution R, and the reference values $A_{min}$ and $A_{max}$ from the control apparatus (not illustrated), for example (step S10). The $T_{max}$ calculation unit 22b and the $T_{min}$ calculation unit 22c determines the maximum value $T_{max}$ and minimum value $T_{min}$ of the temperature parameter T on the basis of the information obtained by the information acquisition unit 42a (steps S11 and S12). After that, the Tsc calculation unit 42b calculates temperature schedule information Tsc including n temperature parameters $T_1$, $T_2$, $T_3$, . . . , and $T_n$ in a range from the maximum value $T_{max}$ to the minimum value $T_{min}$ on the basis of the replica count n, maximum value $T_{max}$, and minimum value $T_{min}$ (step S13). Then, the transmission unit 42c sends the temperature schedule information Tsc to the computing unit 41 (step S14).

The control unit 42 now completes its processing. Then, the computing unit 41 starts its processing. In this connection, steps S11 and S12 may be executed in reverse order.

Each replica 41a1 to 41an of the computing unit 41 repeats the process of updating the value of a bit as many times as specified by the iteration count Nit while accepting a state transition with the probability defined as the above-described equation (1). The exchange control unit 41b exchanges the temperature parameters T between two replicas with the exchange probability defined as the equation (7) each time the update process is performed a prescribed number of times in the replicas 41a1 to 41an. Then, when the number of iterations of the update process in the replicas 41a1 to 41an reaches the iteration count Nit, the exchange control unit 41b obtains the minimum energy value in each of the replicas 41a1 to 41an and a state in which the minimum energy value is obtained. Then, the exchange control unit 41b outputs the minimum energy E among the minimum energy values in the replicas 41a1 to 41an, and the state $x_{out}$ in which the minimum energy E is obtained.

The above-described optimization apparatus 40 of the third embodiment determines an amount of possible change in energy on the basis of the Ising model information, and determines a range of the temperature parameter T for searching for the ground state on the basis of the amount of change. This approach enables the computing unit 41 to perform computation with the replica exchange method within an appropriate range of the temperature parameter T for an optimization problem to be solved. Therefore, it becomes possible to set an appropriate acceptance probability of state transition and thus to suppress a deterioration in the accuracy of solution for the optimization problem.

Fourth Embodiment

Figure 10:
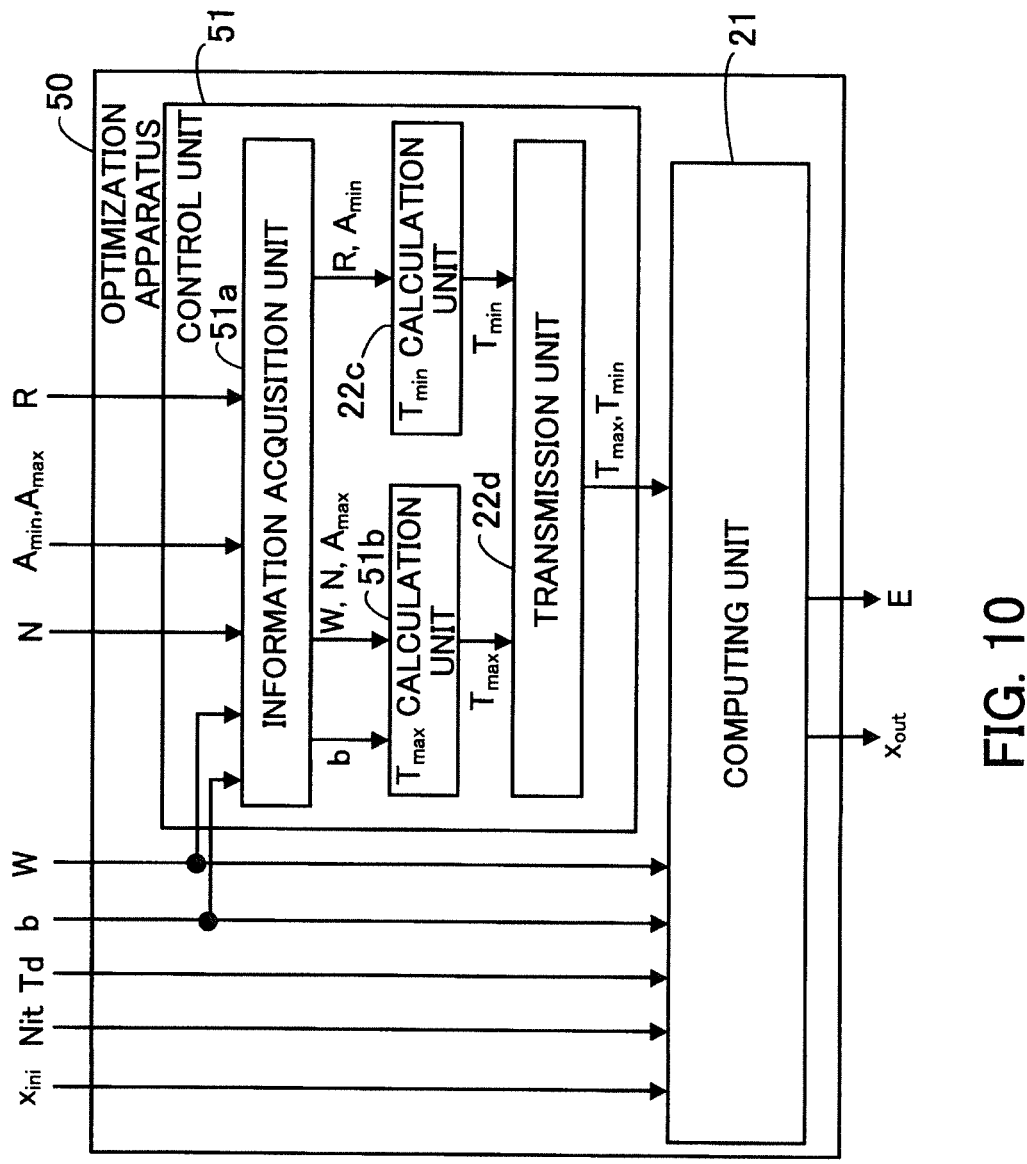
FIG. 10 illustrates an example of an optimization apparatus according to a fourth embodiment.

FIG. 10 illustrates an example of an optimization apparatus according to a fourth embodiment. In FIG. 10, the same reference numerals as used in FIG. 3 indicate the same component elements.

In the optimization apparatus 50 of the fourth embodiment, an information acquisition unit 51a of a control unit 51 obtains a bias coefficient set b, in addition to a resolution R, reference values $A_{min}$ and $A_{max}$, and Ising model information including a total bit count N and a weight coefficient set W, from a control apparatus (not illustrated), for example.

Then, a $T_{max}$ calculation unit 51b determines $\max(\Delta E)$ with the following expression (8) using the weight coefficient set W, total bit count N, and bias coefficient set b.

$$\max(\Delta E) \approx \frac{\left(\sum_{ij}|W_{ij}|\right)}{N} + \max(|b|) \tag{8}$$

In the expression (8), $\max(|b|)$ denotes the maximum value among the absolute values of bias coefficients of all bits included in the Ising model information.

Then, the $T_{max}$ calculation unit 51b determines the maximum value $T_{max}$ of the temperature parameter T with the equation (5) using the determined $\max(\Delta E)$ and the reference value $A_{max}$.

The other component elements in the optimization apparatus 50 operate in the same way as the corresponding ones in the optimization apparatus 20 of the second embodiment.

Since max(ΔE) is determined taking into account the bias coefficient set b, max(ΔE) is obtained with more accuracy. Then, the maximum value $T_{max}$ of the temperature parameter T is determined using thus obtained max(ΔE). By doing so, it is possible to set a more appropriate range of the temperature parameter T for an optimization problem to be solved.

Fifth Embodiment

Figure 11:
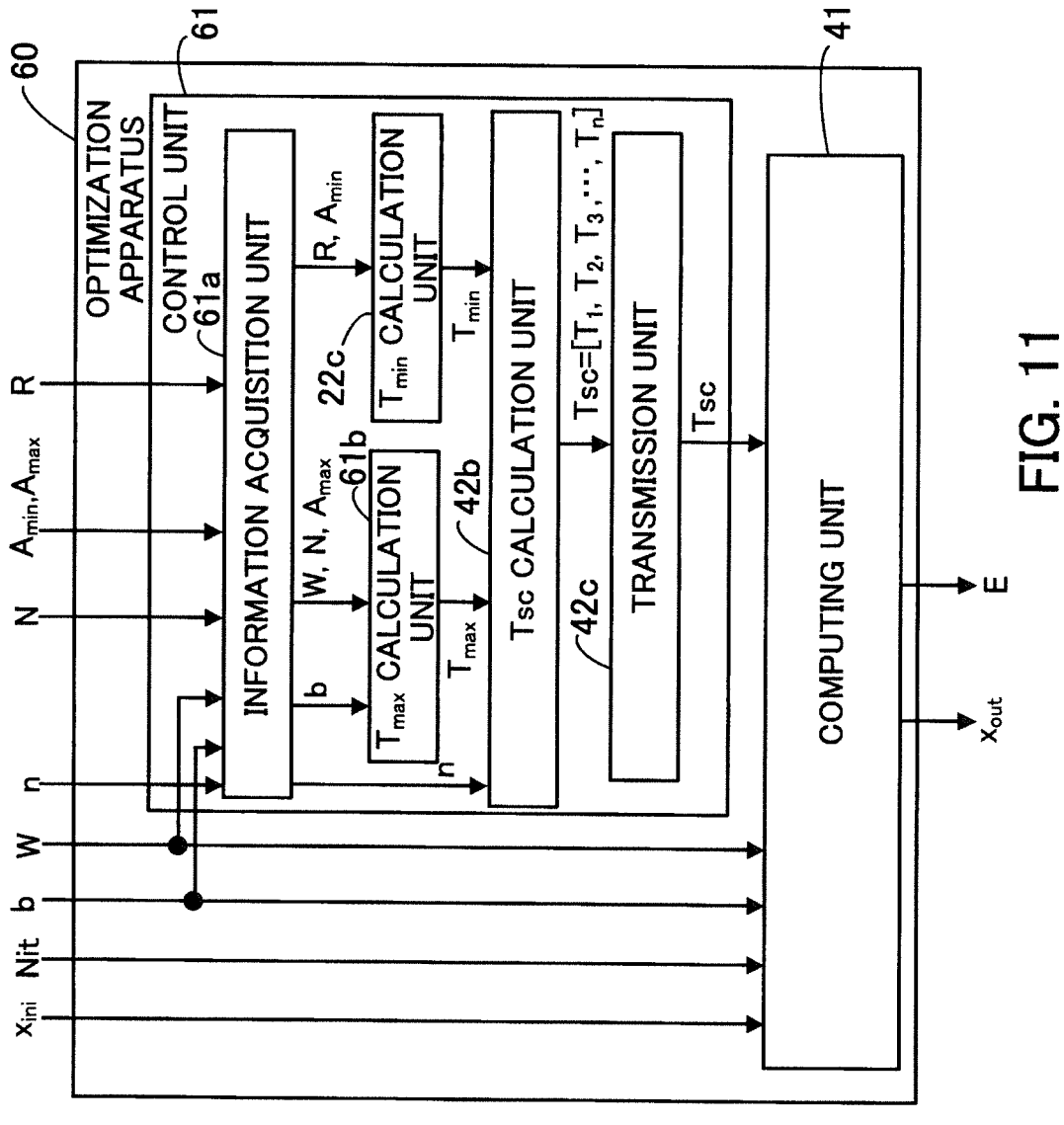
FIG. 11 illustrates an example of an optimization apparatus according to a fifth embodiment.

FIG. 11 illustrates an example of an optimization apparatus according to a fifth embodiment. In FIG. 11, the same reference numerals as used in FIG. 7 indicate the same component elements.

In the optimization apparatus 60 of the fifth embodiment, an information acquisition unit 61*a* of a control unit 61 obtains a bias coefficient set b, in addition to a resolution R, reference values $A_{min}$ and $A_{max}$ a replica count n, a total bit count N, and a weight coefficient set W, from a control apparatus (not illustrated), for example.

Then, a $T_{max}$ calculation unit 61*b* determines max(ΔE) with the above-described expression (8) using the weight coefficient set W, total bit count N, and bias coefficient set b.

Then, the $T_{max}$ calculation unit 61*b* determines the maximum value $T_{max}$ of the temperature parameter T with the equation (5) using the determined max (LE) and reference value $A_{max}$.

The other component elements in the optimization apparatus 60 operate in the same way as the corresponding ones in the optimization apparatus 40 of the third embodiment.

The above-described optimization apparatus 60 of the fifth embodiment provides the same effects as the optimization apparatus 50 of the fourth embodiment.

Sixth Embodiment

Figure 12:
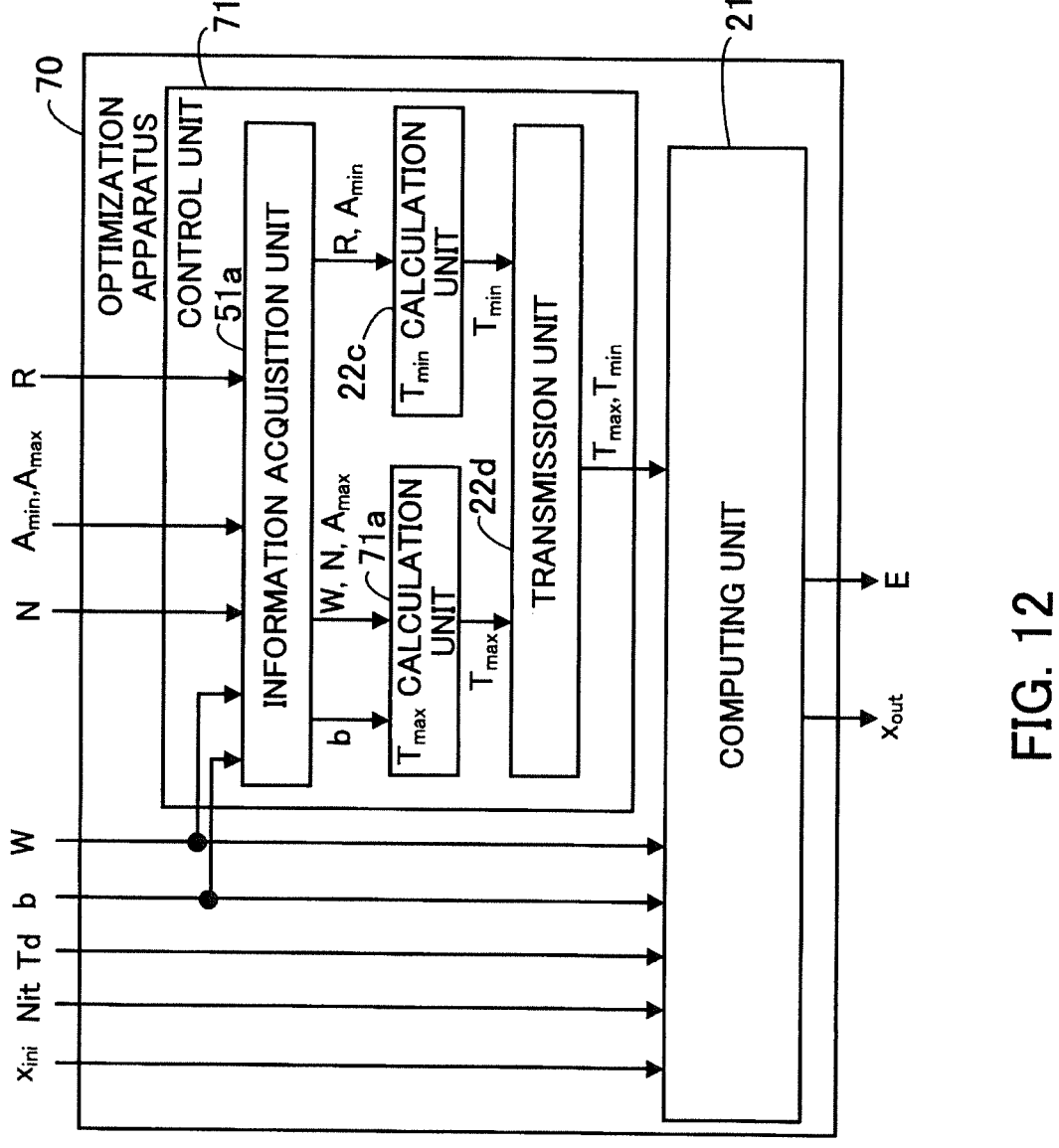
FIG. 12 illustrates an example of an optimization apparatus according to a sixth embodiment.

FIG. 12 illustrates an example of an optimization apparatus according to a sixth embodiment. In FIG. 12, the same reference numerals as used in FIG. 10 indicate the same component elements.

The optimization apparatus 70 of the sixth embodiment has almost the same configuration as the optimization apparatus 50 of FIG. 10, except that a $T_{max}$ calculation unit 71*a* of a control unit 71 calculates the maximum amount of change in energy for each bit with the following expression (9).

$$\max(\Delta E_i) \approx \sum_j |W_{ij}| + |b_i| \qquad (9)$$

In the expression (9), max(ΔE_i) denotes the maximum amount of change in energy for the i-th bit (i=1 to N). max(ΔE) used in the equation (5) refers to the maximum of the maximum amounts of change in energy respectively caused by changing all bits, and is expressed as the following expression (10).

$$\max(\Delta E) \approx \max\left(\sum_j |W_{ij}| + |b_i|\right) \qquad (10)$$

The $T_{max}$ calculation unit 71*a* calculates max (ΔE) from the maximum amounts (max(ΔE_i)) of change in energy respectively calculated for all bits, and determines the maximum value $T_{max}$ of the temperature parameter T with the equation (5) using the calculated max(ΔE) and the reference value $A_{max}$.

The other component elements in the optimization apparatus 70 operate in the same way as the corresponding ones in the optimization apparatus 50 of the fourth embodiment.

Figure 13:
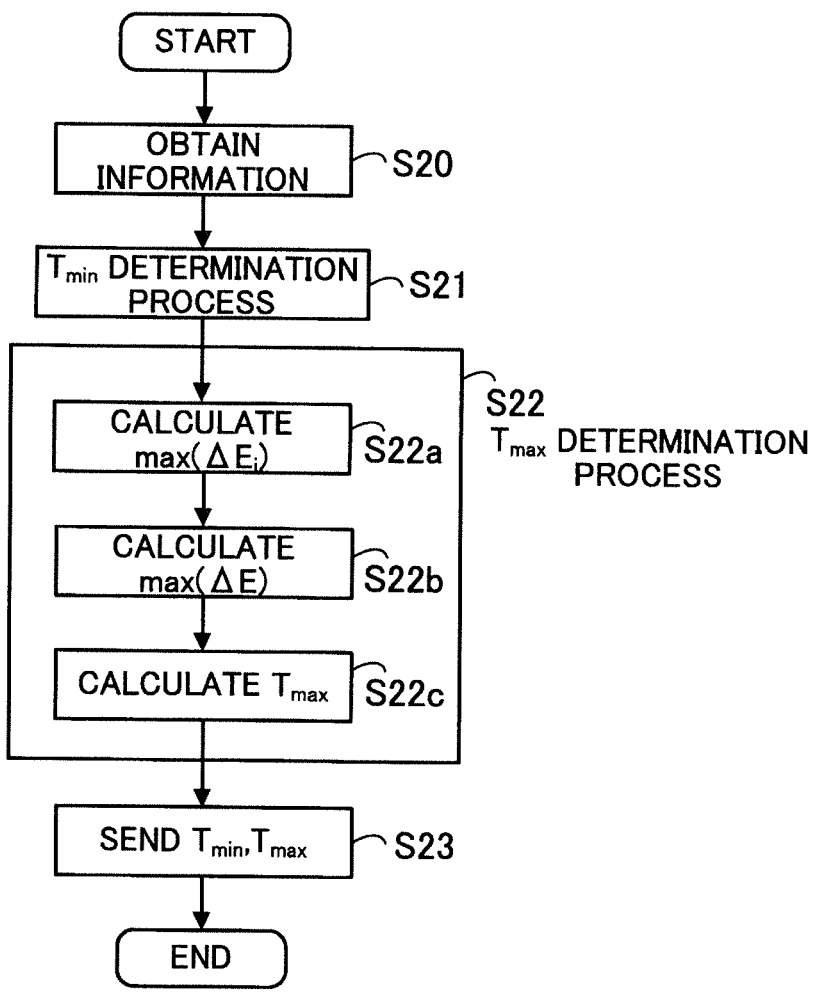
FIG. 13 is a flowchart illustrating an operation flow of a control unit of the optimization apparatus according to the sixth embodiment.

FIG. 13 is a flowchart illustrating the operation flow of the control unit of the optimization apparatus according to the sixth embodiment.

An information acquisition unit 51*a* of the control unit 71 in the optimization apparatus 70 obtains the Ising model information (total bit count N, weight coefficient set W, and bias coefficient set b), the resolution R, and the reference values $A_{min}$ and $A_{max}$ from a control apparatus (not illustrated), for example (step S20). Then, a $T_{min}$ calculation unit 22*c* determines the minimum value $T_{min}$ with the above-described equation (4) using the resolution R and reference value $A_{min}$ (step S21).

The $T_{max}$ calculation unit 71*a* executes the following steps S22*a*, S22*b*, and S22*c* as a process of determining the maximum value $T_{max}$ (step S22). The $T_{max}$ calculation unit 71*a* calculates the maximum amount (max(ΔE_i)) of change in energy for each bit (step S22*a*), and calculates max(ΔE) from the maximum amounts (max(ΔE_i)) of change in energy respectively calculated for the bits (step S22*b*). Then, the $T_{max}$ calculation unit 71*a* calculates the maximum value $T_{max}$ of the temperature parameter T on the basis of the calculated max(ΔE) and reference value $A_{max}$ (step S22*c*).

Then, the transmission unit 22*d* sends the minimum value $T_{min}$ and the maximum value $T_{max}$ to a computing unit 21 (step S23).

The control unit 71 now completes its processing. Then, the computing unit 21 starts its processing as described earlier. In this connection, steps S21 and S22 may be executed in reverse order.

The above-described optimization apparatus 70 of the sixth embodiment determines max(ΔE) from the maximum amounts of change in energy respectively calculated for all bits, so that max(ΔE) is obtained with more accuracy. Then, the optimization apparatus 70 determines the maximum value $T_{max}$ of the temperature parameter T using that max (ΔE). Thus, it is possible to set a more appropriate range of the temperature parameter T for an optimization problem to be solved.

Seventh Embodiment

Figure 14:
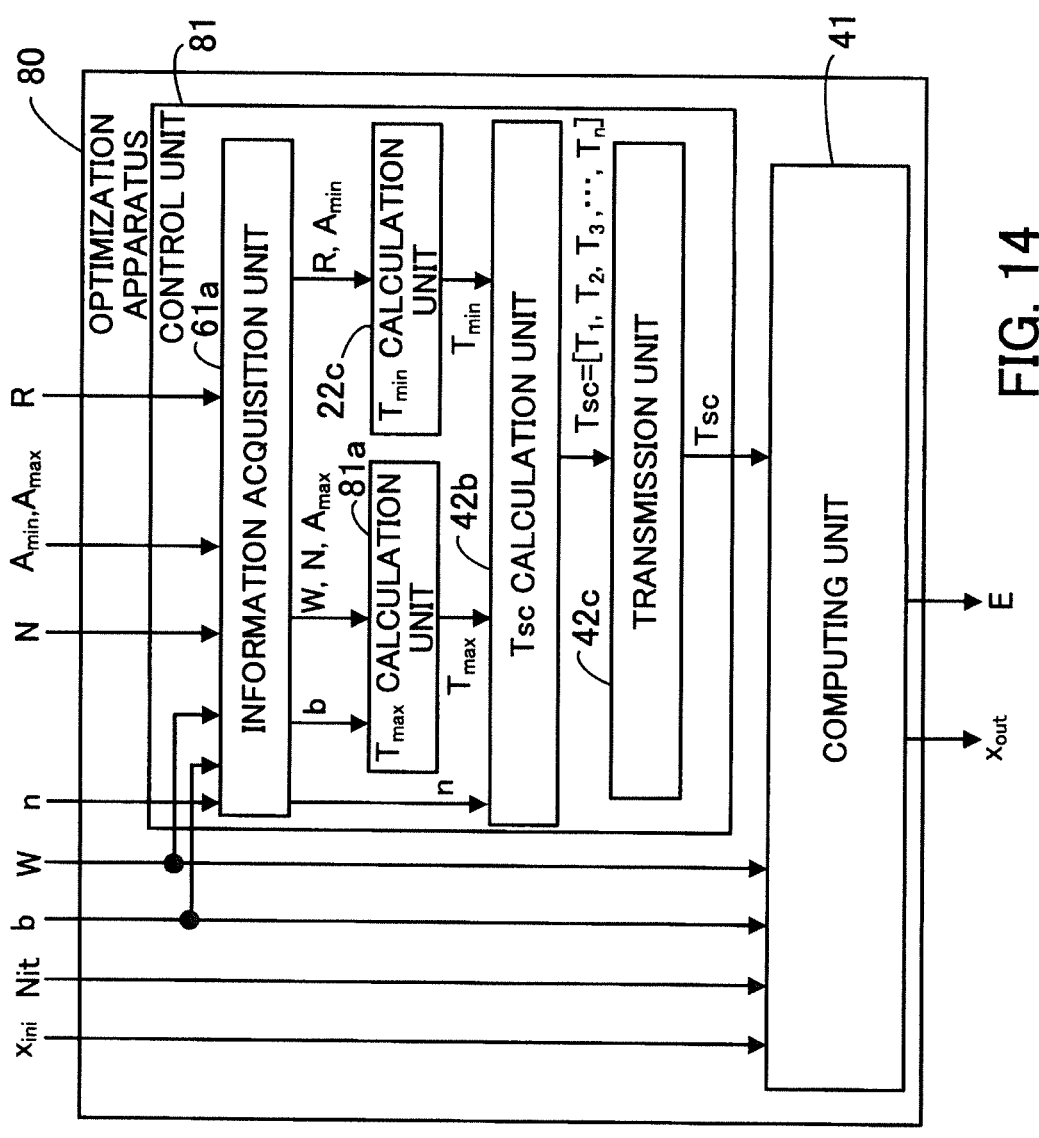
FIG. 14 illustrates an example of an optimization apparatus according to a seventh embodiment.

FIG. 14 illustrates an example of an optimization apparatus according to a seventh embodiment. In FIG. 14, the same reference numerals as used in FIG. 11 indicate the same component elements.

The optimization apparatus 80 of the seventh embodiment has almost the same configuration as the optimization apparatus 60 of FIG. 11, except that a $T_{max}$ calculation unit 81*a* of a control unit 81 calculates the maximum amount of change in energy for each bit with the above-described expression (9), calculates max(ΔE) to be used in the equation (5) with the above-described expression (10), and determines the maximum value $T_{max}$ of the temperature parameter T with the equation (5) using the calculated max(ΔE) and a reference value $A_{max}$.

The other component elements in the optimization apparatus 80 operate in the same way as the corresponding ones in the optimization apparatus 60 of the fifth embodiment.

Figure 15:
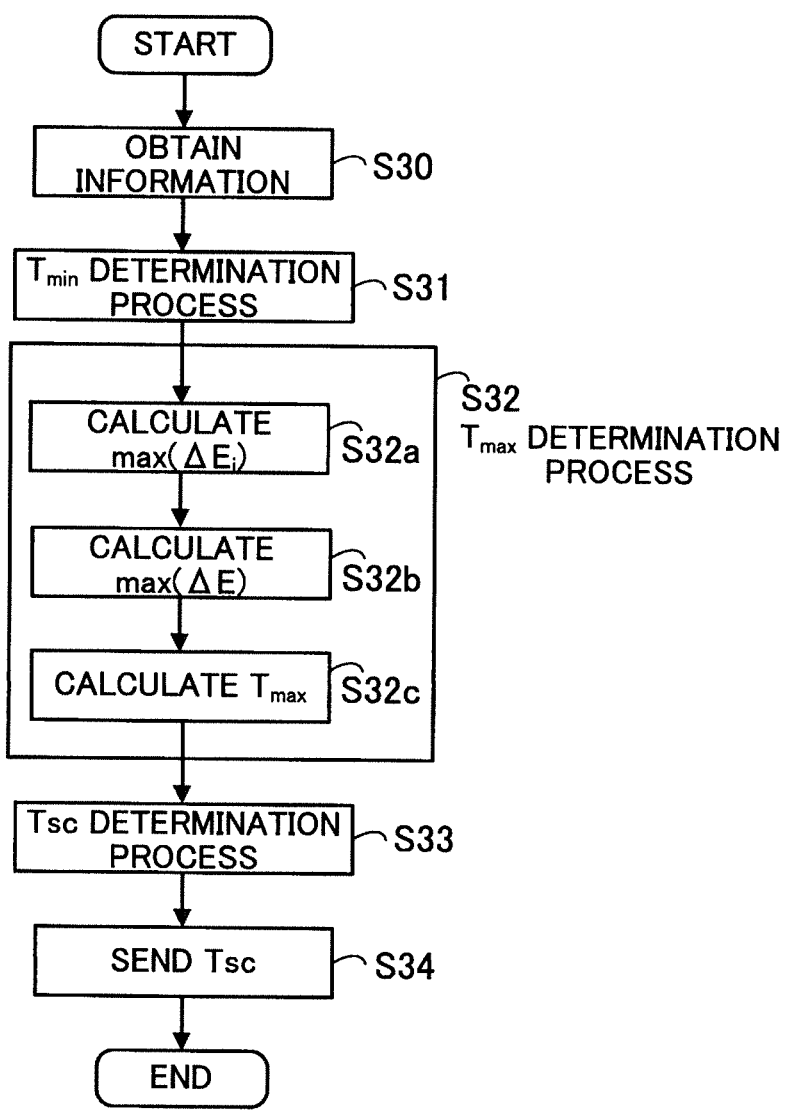
FIG. 15 is a flowchart illustrating an operation flow of a control unit of the optimization apparatus according to the seventh embodiment.

FIG. 15 is a flowchart illustrating an operation flow of the control unit of the optimization apparatus according to the seventh embodiment.

An information acquisition unit 61$a$ of the control unit 81 in the optimization apparatus 80 obtains a bias coefficient set b, in addition to a resolution R, reference values $A_{min}$ and $A_{max}$, a replica count n, a total bit count N, and a weight coefficient set W, from a control apparatus (not illustrated), for example (step S30). Then, a $T_{min}$ calculation unit 22$c$ determines the minimum value $T_{min}$ with the above-described equation (4) using the resolution R and reference value $A_{min}$ (step S31).

The $T_{max}$ calculation unit 81$a$ executes the following steps S32$a$, S32$b$, and S32$c$ as a process of determining the maximum value $T_{max}$ (step S32). The $T_{max}$ calculation unit 81$a$ calculates the maximum amount ($\max(\Delta E_i)$) of change in energy for each bit (step S32$a$), and calculates $\max(\Delta E)$ from the maximum amounts ($\max(\Delta E_i)$) of change in energy respectively calculated for the bits (step S32$b$). Then, the $T_{max}$ calculation unit 81$a$ calculates the maximum value $T_{max}$ of the temperature parameter T on the basis of the calculated $\max(\Delta E)$ and reference value $A_{max}$ (step S32$c$).

Then, a Tsc calculation unit 42$b$ calculates temperature schedule information Tsc including n temperature parameters $T_1, T_2, T_3, \ldots, T_n$ in a range from the maximum value $T_{max}$ to the minimum value $T_{min}$ on the basis of the replica count n, the maximum value $T_{max}$ and the minimum value $T_{min}$ (step S33). Then, the transmission unit 42$c$ sends the temperature schedule information Tsc to the computing unit 41 (step S34).

The control unit 81 now completes its processing. Then, the computing unit 41 starts its processing. In this connection, steps S31 and S32 may be executed in reverse order.

The above-described optimization apparatus 80 of the seventh embodiment provides the same effects as the optimization apparatus 70 of the sixth embodiment.

In this connection, in the above-described optimization apparatuses 70 and 80, the control units 71 and 81 each determine $\max(\Delta E)$ taking into account the influence of the bias coefficient set b. However, if the weight coefficient set W is dominant over the bias coefficient set b, the influence of the bias coefficient set b does not need to be taken into account.

By the way, the functions of each of the control units 12, 22, 42, 51, 61, 71, and 81 of the above-described optimization apparatuses 10, 20, 40, 50, 60, 70, and 80 may be implemented by causing a processor in a control apparatus, such as a PC, to execute a control program, for example.

Figure 16:
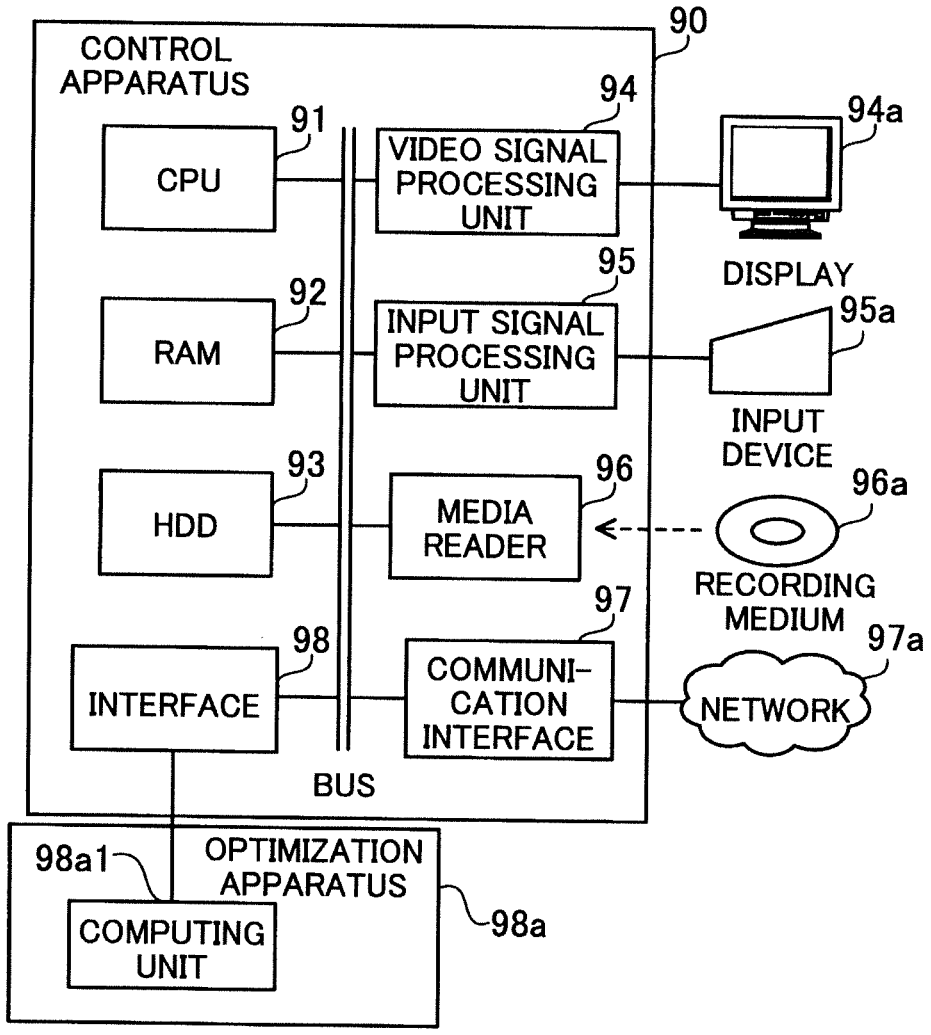
FIG. 16 illustrates an example of a hardware configuration of a control apparatus.

FIG. 16 illustrates an example of a hardware configuration of the control apparatus.

The control apparatus 90 includes a CPU 91, a RAM 92, a hard disk drive (HDD) 93, a video signal processing unit 94, an input signal processing unit 95, a media reader 96, a communication interface 97, and an interface 98. These units are connected to a bus.

The CPU 91 is a processor including a computational circuit that executes program instructions. The CPU 91 loads at least part of a program and data from the HDD 93 to the RAM 92 and runs the program. In this connection, the CPU 91 may include a plurality of processor cores. Alternatively, the control apparatus 90 may include a plurality of processors. The control of an optimization apparatus 98$a$ may be executed by using a plurality of processors or processor cores in parallel.

The RAM 92 is a volatile semiconductor memory device that temporarily stores therein programs to be executed by the CPU 91 and data to be used in operations by the CPU 91.

Note that the control apparatus 90 may be provided with a different type of memory device than RAM, or may be provided with a plurality of memory devices.

The HDD 93 is a non-volatile storage device that stores therein software programs, such as an operating system (OS), middleware, and application software, and data. For example, the programs include a control program for determining the minimum value $T_{min}$ and maximum value $T_{max}$ of the above-described temperature parameter T, and sending them to a computing unit 98$a$1 of the optimization apparatus 98$a$ to cause it to search for the ground state of an Ising model within an appropriate temperature range. Note that the control apparatus 90 may be provided with a different type of storage device, such as a flash memory or a solid state drive (SSD), or may be provided with a plurality of non-volatile storage devices.

The video signal processing unit 94 outputs images (for example, an image providing a result of solving an optimization problem) to a display 94$a$ connected to the control apparatus 90 in accordance with commands from the CPU 91. The display 94$a$ may be any type of display, such as a cathode ray tube (CRT) display, a liquid crystal display (LCD), a plasma display panel (PDP), or an organic electroluminescence (OEL) display.

The input signal processing unit 95 receives an input signal from an input device 95$a$ connected to the control apparatus 90 and outputs the input signal to the CPU 91. As the input device 95$a$, a pointing device, such as a mouse, a touch panel, a touchpad, or a trackball, a keyboard, a remote controller, a button switch, or another may be used. Plural types of input devices may be connected to the control apparatus 90.

The media reader 96 is a reading device for reading programs and data from a recording medium 96$a$. The recording medium 96$a$ may be, for example, a magnetic disk, an optical disc, a magneto-optical disk (MO), or a semiconductor memory device. Examples of magnetic disks include flexible disks (FDs) and HDDs. Examples of optical discs include compact discs (CDs) and digital versatile discs (DVDs).

The media reader 96 copies programs and data read out from the recording medium 96$a$ to a different recording medium, such as the RAM 92 or the HDD 93, for example. The read programs are executed, for example, by the CPU 91. Note that the recording medium 96$a$ may be a portable recording medium and used to distribute the programs and data. The recording medium 96$a$ and the HDD 93 are sometimes referred to as computer-readable recording media.

The communication interface 97 is connected to a network 97$a$, and communicates with other information processing apparatuses over the network 97$a$. The communication interface 97 may be a wired communication interface that is connected to a communication device such as a switch with a cable, or a wireless communication interface that is connected to a base station with a wireless link.

The interface 98 performs communication with the optimization apparatus 98$a$. The computing unit 98$a$1 of the optimization apparatus 98$a$ is, for example, one of the computing units 11, 21, and 41 in the optimization apparatuses 10, 20, 40, 50, 60, 70, and 80 of the first to seventh embodiments.

As described earlier, the processing contents of the above-described control apparatus 90 are implemented by causing a computer to execute programs.

The programs may be recorded on a computer-readable recording medium (for example, recording medium 96$a$).

The recording medium may be, for example, a magnetic disk, an optical disc, a magneto-optical disk, or a semiconductor memory device. Examples of magnetic disks include FDs and HDDs. Examples of optical discs include CDs, recordable compact discs (CD-Rs), rewritable compact discs (CD-RWs), DVDs, DVD-Rs, and DVD-RWs. The programs may be recorded on portable recording media that are then distributed. In this case, the programs may be copied from a portable recording medium to another recording medium (for example, HDD 93) and then executed.

Heretofore, one aspect of an optimization apparatus, a control method of the optimization apparatus, and a control program of the optimization apparatus has been described with reference to the embodiments. However, these are just an example and are not limited to the above description.

According to one aspect, the above-described embodiments make it possible to suppress a deterioration in the accuracy of solutions for optimization problems.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a computing circuit configured to search for a ground state of energy value of an Ising model with simulated annealing or a replica exchange method, based on Ising model information and a temperature parameter, the Ising model information representing the Ising model; and
a control circuit configured to
receive, from a control apparatus, a resolution in value of the Ising model information and a first reference value which indicates an acceptance probability of state transition in the Ising model at a minimum value of the temperature parameter, wherein the resolution is a constant value which indicates a limit of representation capacity of the computing circuit and is determined by a characteristic of hardware of the computing circuit,
determine the minimum value by dividing the resolution by a natural logarithm of the first reference value,
determine a maximum amount of change in the value of the Ising model information, based on the Ising model information,
determine a maximum value of the temperature parameter, based on the maximum amount of change in the value of the Ising model information and a second reference value, the second reference value being greater than the first reference value and indicating the acceptance probability at the maximum value of the temperature parameter, and
cause the computing circuit to search for the ground state of the energy value of the Ising model based on change in energy by the simulated annealing or the replica exchange method using the temperature parameter having a range defined by the minimum value and the maximum value.

2. The information processing apparatus according to claim 1, wherein the control circuit determines the maximum value of the temperature parameter by dividing the maximum amount of change by a natural logarithm of the second reference value.

3. The information processing apparatus according to claim 1, wherein the control circuit determines the maximum amount of change by dividing a sum of absolute values of weight coefficients included in the Ising model information by a total bit count of the Ising model.

4. The information processing apparatus according to claim 1, wherein the control circuit determines the maximum amount of change by dividing a sum of absolute values of weight coefficients included in the Ising model information by a total bit count of the Ising model and adding, to a result of the dividing, a maximum value among absolute values of bias coefficients of all bits included in the Ising model information.

5. The information processing apparatus according to claim 1, wherein the control circuit calculates first maximum amounts of change that are respectively caused by changing all bits included in the Ising model, and determines, as the maximum amount of change, a maximum of the first maximum amounts respectively calculated for all the bits.

6. The information processing apparatus according to claim 1, wherein the computing circuit searches for the ground state with simulated annealing by receiving temperature drop control information indicating how to decrease a value of the temperature parameter and decreases the value of the temperature parameter from the maximum value to the minimum value in accordance with the temperature drop control information.

7. The information processing apparatus according to claim 1, wherein:
the computing circuit includes replicas each of which performs update process with respect to same bits of the Ising model and the computing circuit searches for the ground state with a replica exchange method by using the replicas; and
the control circuit determines temperature schedule information including, for each of the replicas, a value of the temperature parameter in a range from the maximum value to the minimum value, and sends the temperature schedule information to the computing circuit.

8. A control method of an information processing apparatus, the control method comprising:
receiving, by a control circuit of the information processing apparatus, a resolution in value of Ising model information and a first reference value which indicates an acceptance probability of state transition in an Ising model at a minimum value of the temperature parameter from a control apparatus, wherein the resolution is a constant value which indicates a limit of representation capacity of a computing circuit and is determined by a characteristic of hardware of the computing circuit which is configured to search for a ground state of energy value of the Ising model with simulated annealing or a replica exchange method, based on the Ising model information representing the Ising model and the temperature parameter,
determining, by the control circuit, the minimum value by dividing the resolution by a natural logarithm of the first reference value;
determining, by the control circuit, a maximum amount of change, based on the Ising model information;
determining, by the control circuit, a maximum value of the temperature parameter based on the maximum amount of change and a second reference value, the second reference value being greater than the first reference value and indicating the acceptance probability at the maximum value of the temperature parameter; and causing, by the control circuit, the computing circuit to search for the ground state of the energy value of the Ising model based on change in energy by the simulated annealing or the replica exchange method using the temperature parameter having a range defined by the minimum value and the maximum value.

9. A non-transitory computer-readable recording medium storing a control program of an information processing apparatus that causes a computer to execute a process comprising:

receiving, from a control apparatus, a resolution in value of Ising model information and a first reference value which indicates an acceptance probability of state transition in an Ising model at a minimum value of the temperature parameter, wherein the resolution is a constant value which indicates a limit of representation capacity of a computing circuit and is determined by a characteristic of hardware of a computing circuit which is configured to search for a ground state of energy value of the Ising model with simulated annealing or a replica exchange method, based on the Ising model information representing the Ising model and the temperature parameter, determining the minimum value by dividing the resolution by a natural logarithm of the first reference value;

determining a maximum amount of change, based on the Ising model information;

determining a maximum value of the temperature parameter based on the maximum amount of change and a second reference value, the second reference value being greater than the first reference value and indicating the acceptance probability at the maximum value of the temperature parameter; and causing the computing circuit to search for the ground state of the energy value of the Ising model based on change in energy by the simulated annealing or the replica exchange method using the temperature parameter having a range defined by the minimum value and the maximum value.

* * * * *